US012382440B2

(12) United States Patent
Ko et al.

(10) Patent No.: US 12,382,440 B2
(45) Date of Patent: Aug. 5, 2025

(54) METHOD AND DEVICE FOR TRANSMITTING INFORMATION RELATED TO SLOT PATTERN IN NR V2X

(71) Applicant: LG Electronics Inc., Seoul (KR)

(72) Inventors: Woosuk Ko, Seoul (KR); Seungmin Lee, Seoul (KR); Daesung Hwang, Seoul (KR)

(73) Assignee: LG Electronics Inc.

( * ) Notice: Subject to any disclaimer, the term of this patent is extended or adjusted under 35 U.S.C. 154(b) by 483 days.

(21) Appl. No.: 17/917,976

(22) PCT Filed: Apr. 9, 2021

(86) PCT No.: PCT/KR2021/004495
§ 371 (c)(1),
(2) Date: Oct. 10, 2022

(87) PCT Pub. No.: WO2021/206505
PCT Pub. Date: Oct. 14, 2021

(65) Prior Publication Data
US 2023/0142228 A1   May 11, 2023

Related U.S. Application Data

(60) Provisional application No. 63/031,547, filed on May 28, 2020, provisional application No. 63/025,967, (Continued)

(30) Foreign Application Priority Data

Oct. 15, 2020   (KR) .................. 10-2020-0133504

(51) Int. Cl.
*H04W 72/0446*   (2023.01)
*H04L 5/14*   (2006.01)
(Continued)

(52) U.S. Cl.
CPC .......... *H04W 72/0446* (2013.01); *H04L 5/14* (2013.01); *H04W 72/40* (2023.01)

(58) Field of Classification Search
None
See application file for complete search history.

(56) References Cited

U.S. PATENT DOCUMENTS 11,849,431 B2    12/2023  Ohara et al.
12,058,082 B2 *   8/2024  Yoshioka .................. H04L 5/14
(Continued)

FOREIGN PATENT DOCUMENTS

CN           110536449         12/2019
WO      WO 2020/065896          4/2020

OTHER PUBLICATIONS

Huawei & HiSilicon, "Remaining details of sidelink synchronization mechanisms," R1-2000185, Presented at 3GPP TSG RAN WG1 Meeting #100-e, Feb. 24-Mar. 6, 2020, 14 pages.
(Continued)

*Primary Examiner* — Duc T Duong
(74) *Attorney, Agent, or Firm* — Fish & Richardson P.C.

(57) ABSTRACT

Proposed is an operation method of a first device (100) in a wireless communication system. The method may comprise the steps of: receiving TDD-UL-DL configuration information including information related to a first slot pattern and information related to a second slot pattern from a base station (300); determining a value related to granularity on the basis of i) a period of the first slot pattern, ii) a period of the second slot pattern, and iii) first subcarrier spacing related to SL communication; and transmitting a physical sidelink broadcast channel (PSBCH) including information related to a first UL resource and information related to a second UL resource to a second device (200).

15 Claims, 20 Drawing Sheets

Related U.S. Application Data filed on May 15, 2020, provisional application No. 63/007,911, filed on Apr. 9, 2020.

(51) Int. Cl.
*H04W 72/23* (2023.01)
*H04W 72/25* (2023.01)
*H04W 72/40* (2023.01)

(56) References Cited

U.S. PATENT DOCUMENTS

| | | | | |
|---|---|---|---|---|
| 2021/0051672 | A1* | 2/2021 | Rastegardoost | H04W 74/006 |
| 2021/0099988 | A1* | 4/2021 | Wu | H04L 5/0078 |
| 2021/0321369 | A1* | 10/2021 | Chen | H04W 76/27 |
| 2022/0353660 | A1* | 11/2022 | Ye | H04W 24/08 |
| 2022/0393846 | A1* | 12/2022 | Jiao | H04L 5/0094 |
| 2023/0134836 | A1* | 5/2023 | Yoshioka | H04L 27/26025 370/329 |
| 2023/0217469 | A1* | 7/2023 | Hu | H04W 72/40 370/329 |

OTHER PUBLICATIONS

Office Action in Korean Appln. No. 10-2022-7034381, dated Nov. 21, 2022, 14 pages (with English translation).
Catt, "Feature lead summary on AI 7.2.4.3 Sidelink synchronization mechanism," 3GPP TSG RAN WG1 Meeting #99, R1-191xxxx, Reno, USA, Nov. 18-22, 2019, 45 pages.
Extended European Search Report in European Appln. No. 21785027.0, mailed on Apr. 5, 2024, 13 pages.
LG Electronics, "Discussion on NR sidelink synchronization mechanism," 3GPP TSG RAN WG1 #99 Meeting, R1-1912590, Reno, US, Nov. 18-22, 2019, 9 pages.
LG Electronics, "Discussion on physical layer structure for NR sidelink," 3GPP TSG RAN WG1 #99, RI-1912586, Reno, USA, Nov. 18-22, 2019, 34 pages.
LG Electronics, "Summary of RAN1 Agreements/Working assumptions in WI 5G V2X with NR sidelink," 3GPP TSG RAN WG1 #98bis, R1-1911725, Chongqing, China, Oct. 14-20, 2019, 22 pages.
LG Electronics, "Summary of RAN1 Agreements/Working assumptions in WI 5G V2X with NR sidelink," 3GPP TSG RAN WG1 #99, R1-1913601, Reno, USA, Nov. 18-22, 2019, 40 pages.
Nokia, Nokia Shanghai Bell, "Remaining details of Sidelink Synchronization mechanism," 3GPP TSG-RAN WG1 Meeting #100-e, R1-2000385, e-Meeting, Feb. 24-Mar. 6, 2020, 13 pages.
Notice of Allowance in Korean Appln. No. 10-2022-7034381, mailed on Feb. 20, 2023, 8 pages (with English translation).
Vivo, "Sidelink synchronization mechanism," 3GPP TSG RAN WG1 Meeting #98bis, R1-1911421, Chongqing, China, Oct. 14-20, 2019, 19 pages.
Catt, "Feature lead summary #2 on AI 7.2.4.3 Sidelink synchronization mechanism," 3GPP TSG RAN WG1 Meeting #101, R1-2003616, e-Meeting, May 25-Jun. 5, 2020, 32 pages.
Catt, "Feature lead summary on AI 7.2.4.3 #3 Sidelink synchronization mechanism—Email discussion outcomes," 3GPP TSG RAN WG1 Meeting #100, R1-2001363, e-Meeting, Feb. 24-Mar. 6, 2020, 5 pages.
LG Electronics, "Discussion on NR sidelink synchronization mechanism," 3GPP TSG RAN WG1 #100, R1- 2000784, E-Meeting, Feb. 24-Mar. 6, 2020, 13 pages.
Samsung, "On Synchronization Mechanisms for NR Sidelink," 3GPP TSG RAN WG1 #100e, R1-2000619, e-Meeting, Feb. 24-Mar. 6, 2020, 13 pages.

* cited by examiner

METHOD AND DEVICE FOR TRANSMITTING INFORMATION RELATED TO SLOT PATTERN IN NR V2X

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, a CAM may include basic vehicle information such as vehicle dynamic state information such as direction and speed, vehicle static data such as dimensions, external lighting conditions, and route details. For example, a UE may broadcast a CAM, and CAM latency may be less than 100 ms. For example, when an unexpected situation such as a breakdown of a vehicle or an accident occurs, a UE may generate a DENM and transmit it to another UE. For example, all vehicles within the transmission range of a UE may receive a CAM and/or a DENM. In this case, a DENM may have a higher priority than a CAM.

Thereafter, regarding V2X communication, various V2X scenarios are proposed in NR. For example, the various V2X scenarios may include vehicle platooning, advanced driving, extended sensors, remote driving, or the like.

For example, based on vehicle platooning, vehicles can be dynamically grouped and moved together. For example, to perform platoon operations based on vehicle platooning, vehicles belonging to a group may receive periodic data from a leading vehicle. For example, the vehicles belonging to the group may reduce or widen the distance between the vehicles by using periodic data.

For example, based on improved driving, a vehicle can be semi-automated or fully automated. For example, each vehicle may adjust trajectories or maneuvers based on data obtained from local sensors of the proximate vehicle and/or proximate logical entity. Also, for example, each vehicle may share driving intention with adjacent vehicles.

For example, based on an extended sensors, raw data or processed data, or live video data obtained through local sensors, may be interchanged between vehicles, logical entities, pedestrian terminals and/or V2X application servers. For example, a vehicle may recognize an environment that is improved compared to an environment that can be detected using its own sensor.

For example, based on remote driving, for a person who cannot drive or a remote vehicle located in a dangerous environment, a remote driver or V2X application may operate or control the remote vehicle. For example, when a route can be predicted, such as in public transportation, cloud computing-based driving may be used to operate or control the remote vehicle. Also, for example, access to a cloud-based back-end service platform may be considered for remote driving.

Meanwhile, a method of specifying service requirements for various V2X scenarios such as vehicle platooning, enhanced driving, extended sensors, and remote driving is being discussed in NR-based V2X communication.

SUMMARY OF THE DISCLOSURE

Technical Solutions

According to an embodiment, a method of operating a first device 100 in a wireless communication system is proposed. The method may comprise: receiving a TDD-UL-DL configuration information, from a base station 300, including information related to a first slot pattern and information related to a second slot pattern; determining a value related to granularity, based on i) a periodicity of the first slot pattern, ii) a periodicity of the second slot pattern and iii) a first subcarrier spacing (SCS) related to SL communication; and transmitting a physical sidelink broadcast channel (PSBCH), to a second device 200, including information related to a first UL resource and information related to a second UL resource.

Effects of the Disclosure

The user equipment (UE) can efficiently perform SL communication.

DESCRIPTION OF EXEMPLARY EMBODIMENTS

Figure 1:
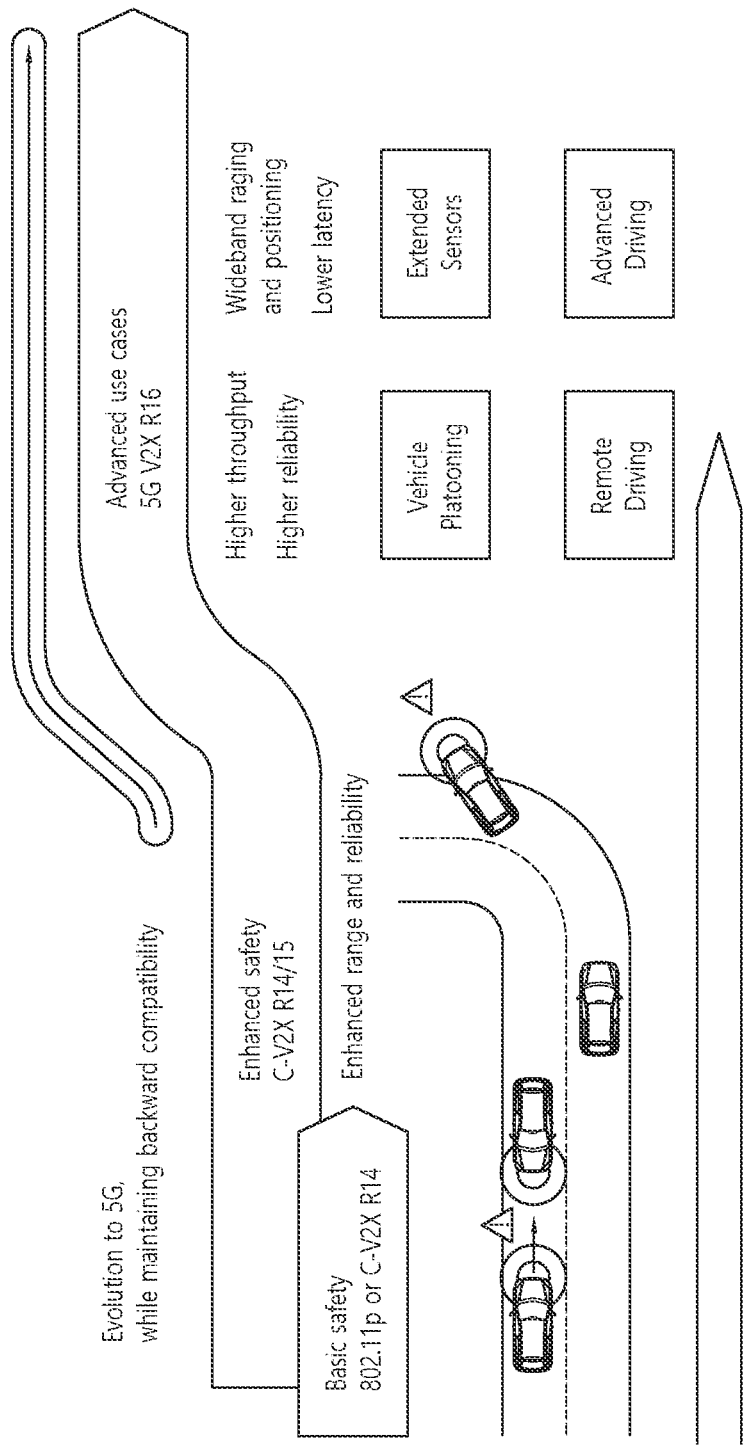
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
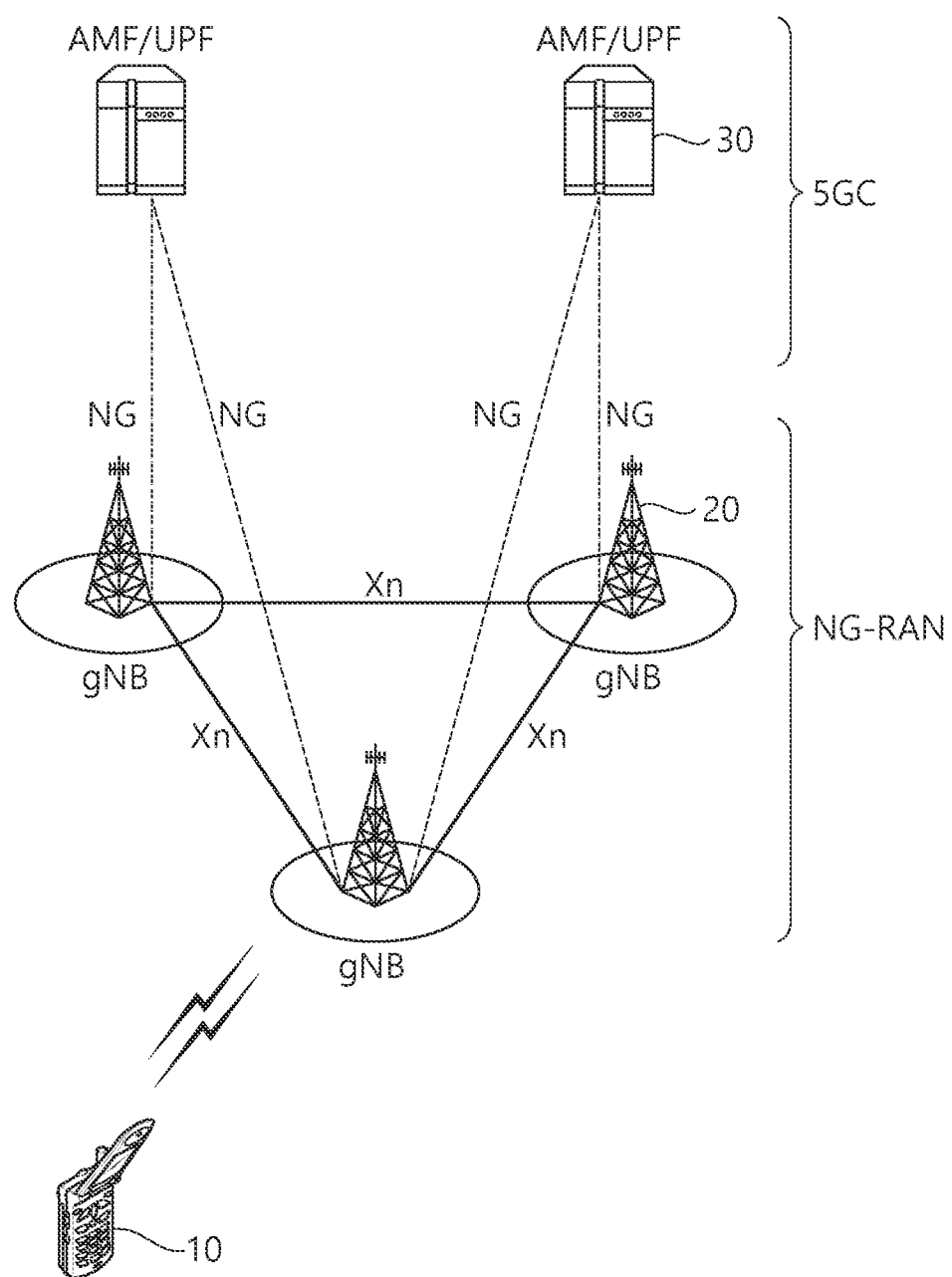
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
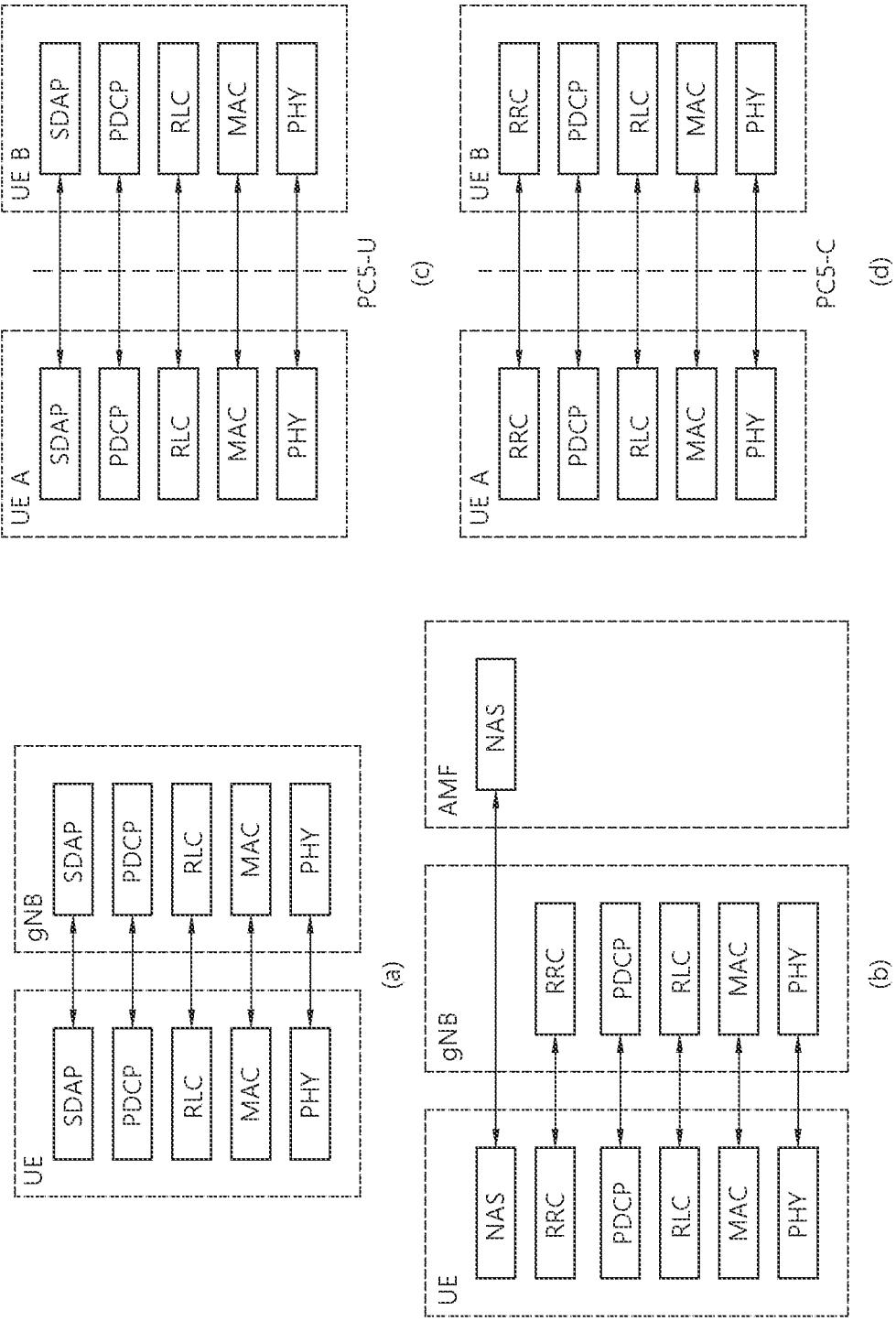
FIG. 3 shows a radio protocol architecture, based on an embodiment of the present disclosure.

FIG. 3 shows a radio protocol architecture, based on an embodiment of the present disclosure. The embodiment of FIG. 3 may be combined with various embodiments of the present disclosure. Specifically, (a) of FIG. 3 shows a radio protocol stack of a user plane for Uu communication, and (b) of FIG. 3 shows a radio protocol stack of a control plane for Uu communication. (c) of FIG. 3 shows a radio protocol stack of a user plane for SL communication, and (d) of FIG. 3 shows a radio protocol stack of a control plane for SL communication.

Referring to FIG. 3, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
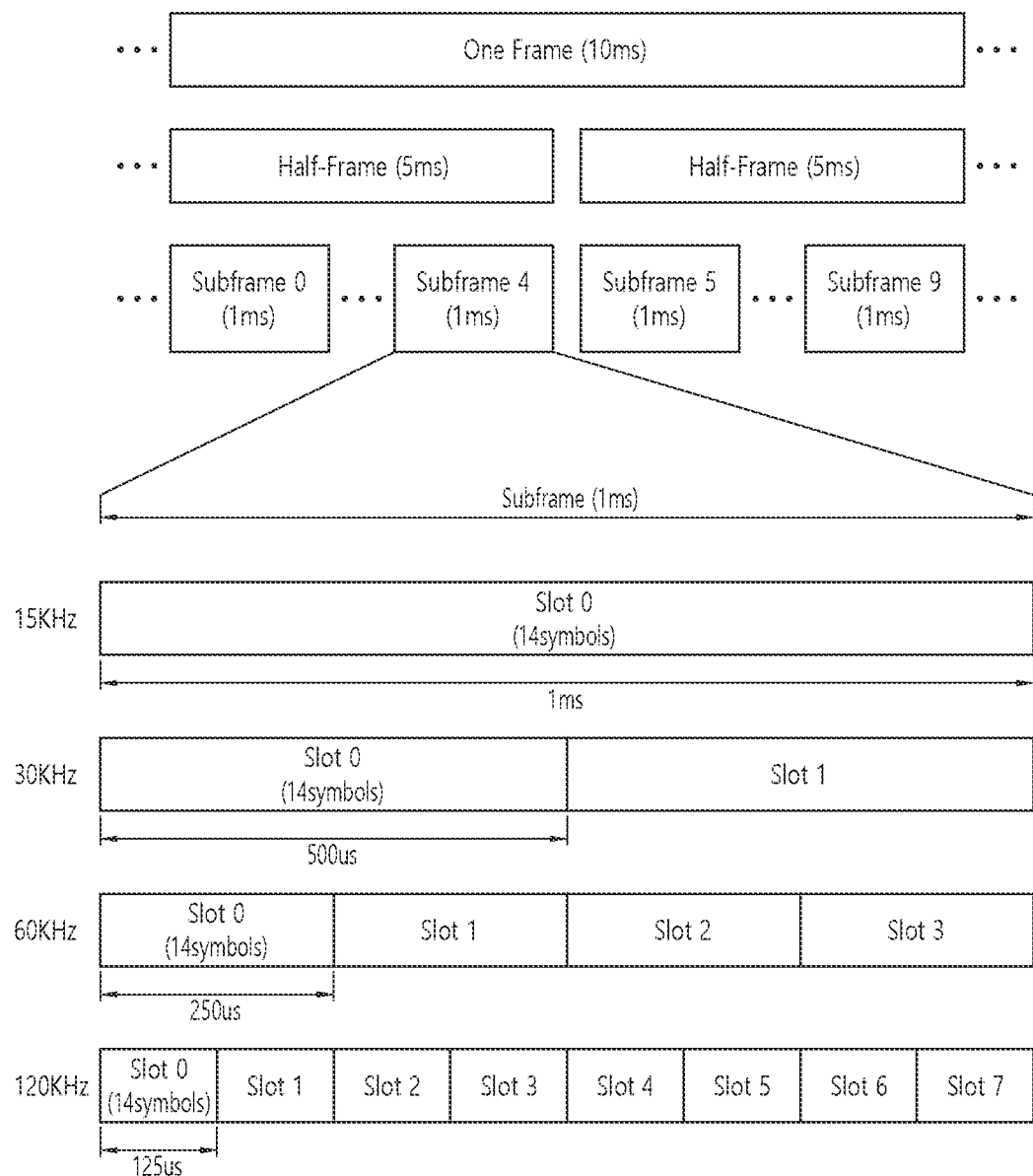
FIG. 4 shows a structure of a radio frame of an NR, based on an embodiment of the present disclosure.

FIG. 4 shows a structure of a radio frame of an NR, based on an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15*2$^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15*2$^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
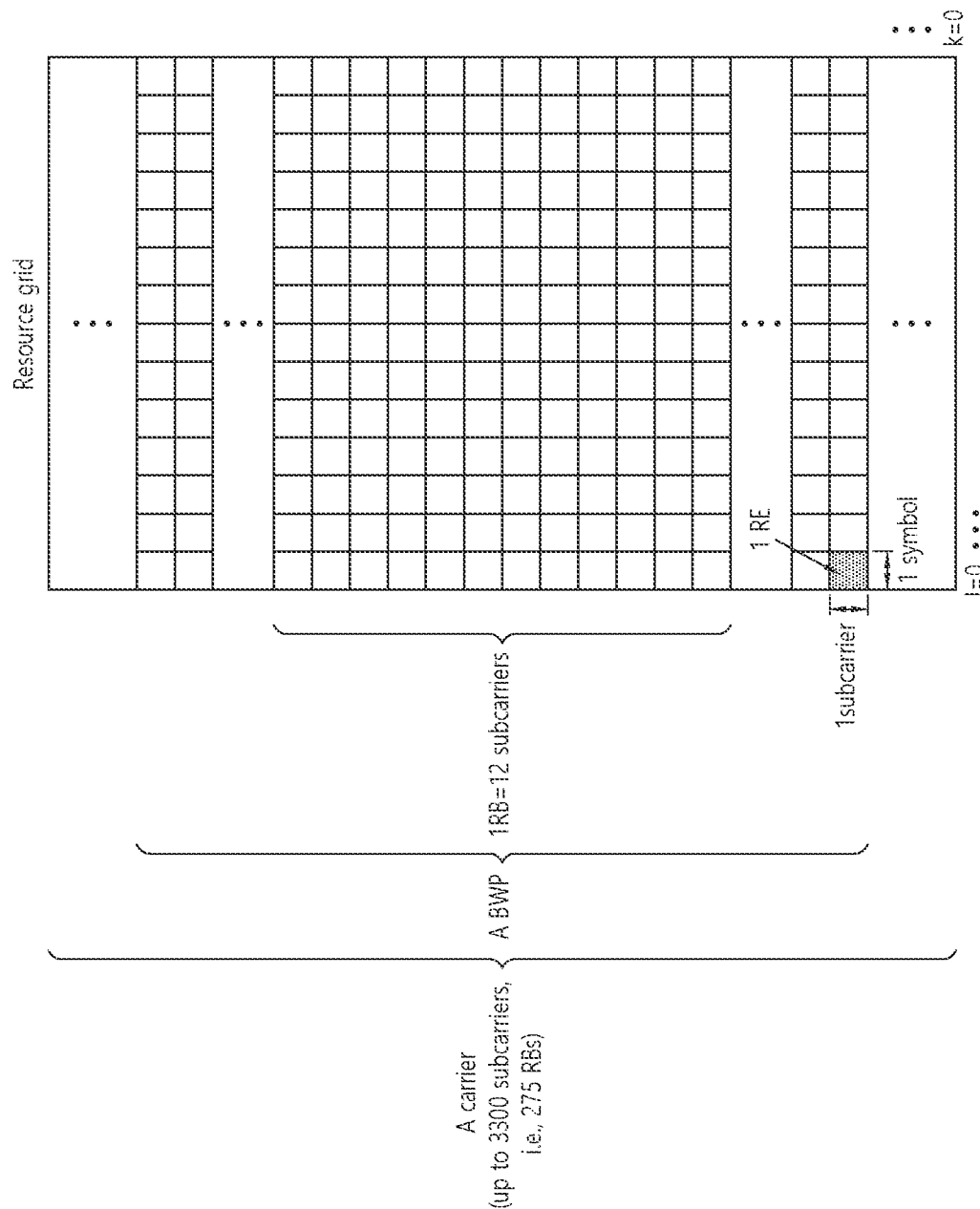
FIG. 5 shows a structure of a slot of an NR frame, based on an embodiment of the present disclosure.

FIG. 5 shows a structure of a slot of an NR frame, based on an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 6:
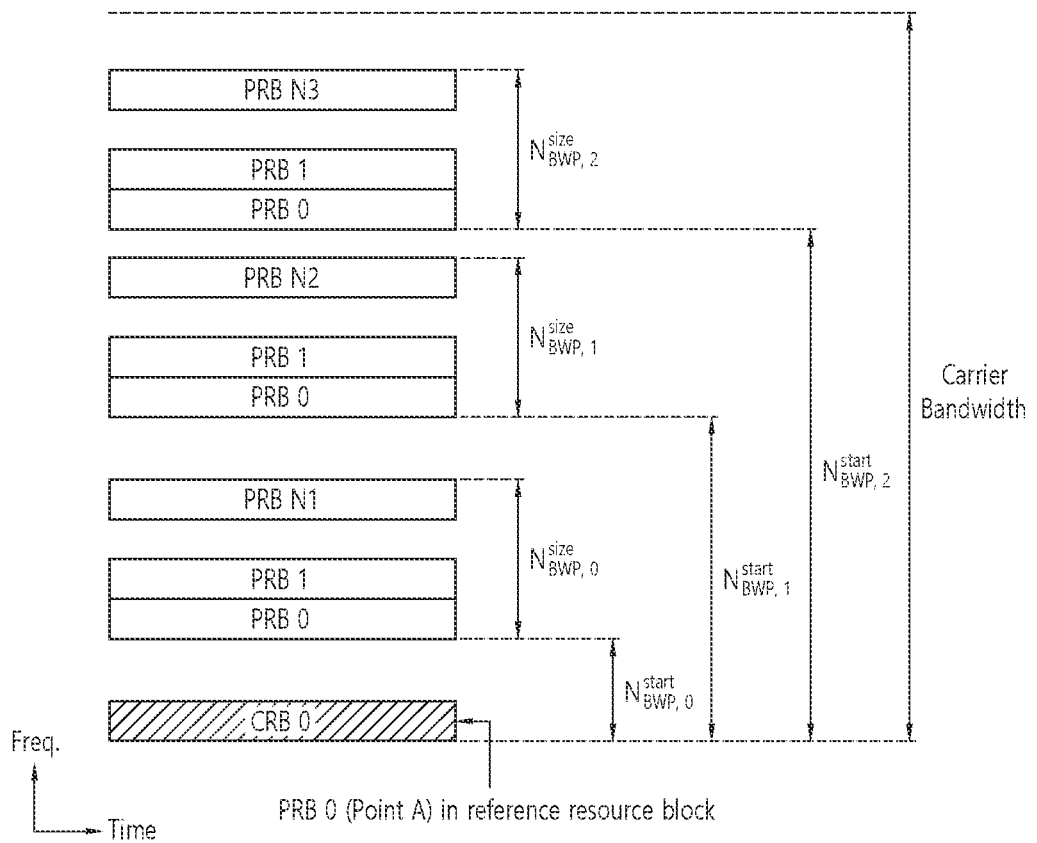
FIG. 6 shows an example of a BWP, based on an embodiment of the present disclosure.

FIG. 6 shows an example of a BWP, based on an embodiment of the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/ PSBCH block, hereinafter, sidelink-synchronization signal block (S-SSB)) supporting periodical transmission. The S-SSB may have the same numerology (i.e., SCS and CP length) as a physical sidelink control channel (PSCCH)/ physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 7:
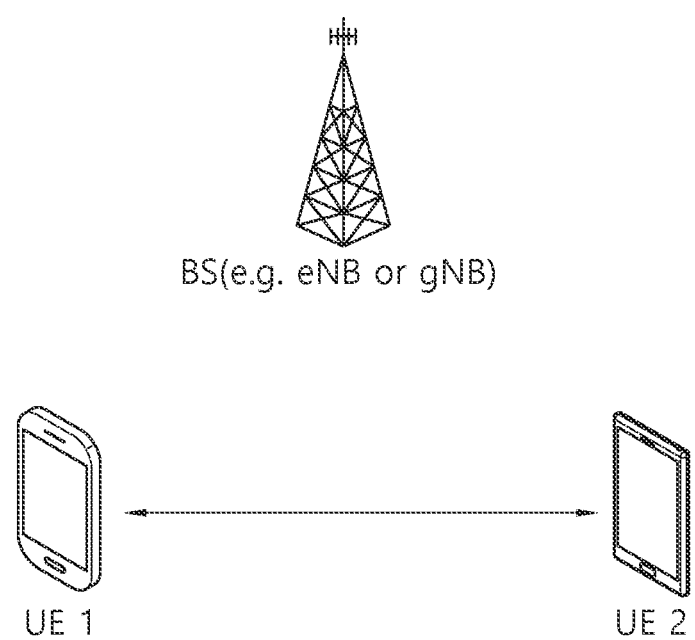
FIG. 7 shows a UE performing V2X or SL communication, based on an embodiment of the present disclosure.

FIG. 7 shows a UE performing V2X or SL communication, based on an embodiment of the present disclosure. The embodiment of FIG. 7 may be combined with various embodiments of the present disclosure.

Referring to FIG. 7, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 8:
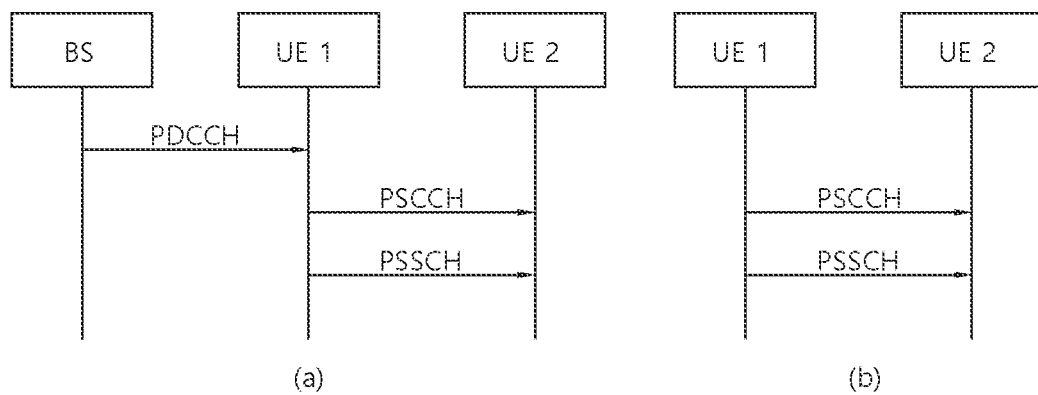
FIG. 8 shows a procedure of performing V2X or SL communication by a UE based on a transmission mode, based on an embodiment of the present disclosure.

FIG. 8 shows a procedure of performing V2X or SL communication by a UE based on a transmission mode, based on an embodiment of the present disclosure. The embodiment of FIG. 8 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 8 shows a UE operation related to an LTE transmission mode 1 or an LTE transmission mode 3. Alternatively, for example, (a) of FIG. 8 shows a UE operation related to an NR resource allocation mode 1. For example, the LTE transmission mode 1 may be applied to general SL communication, and the LTE transmission mode 3 may be applied to V2X communication.

For example, (b) of FIG. 8 shows a UE operation related to an LTE transmission mode 2 or an LTE transmission mode 4. Alternatively, for example, (b) of FIG. 8 shows a UE operation related to an NR resource allocation mode 2.

Referring to (a) of FIG. 8, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (e.g., downlink control information (DCI)) or RRC signaling (e.g., Configured Grant Type 1 or Configured Grant Type 2), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 8, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 9:
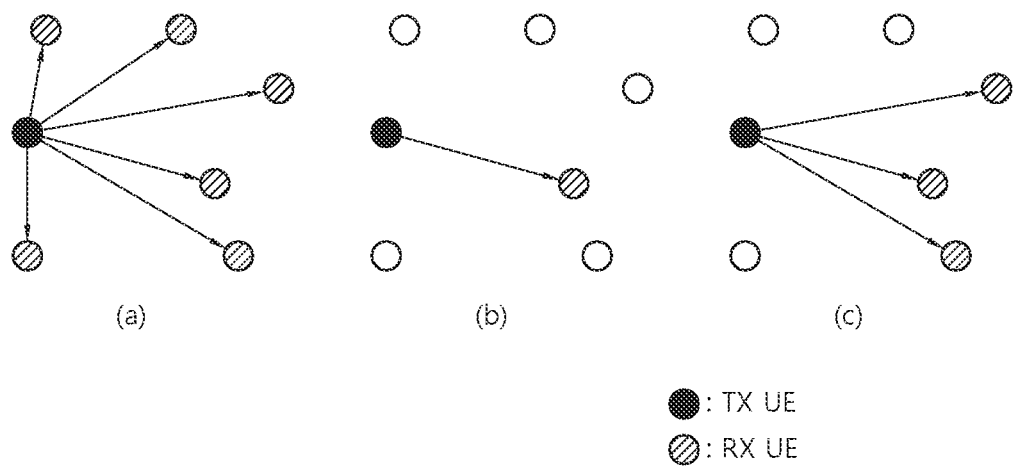
FIG. 9 shows three cast types, based on an embodiment of the present disclosure.

FIG. 9 shows three cast types, based on an embodiment of the present disclosure. The embodiment of FIG. 9 may be combined with various embodiments of the present disclosure. Specifically, (a) of FIG. 9 shows broadcast-type SL communication, (b) of FIG. 9 shows unicast type-SL communication, and (c) of FIG. 9 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

According to an embodiment of the present disclosure, in order to avoid interference between a sidelink (SL) signal and a downlink (DL) signal among resource configurations defined in Uu link, NR V2X system may use only a UL resource as an SL resource. At this time, a base station may change UL/DL configuration of the Uu link and signal the changed UL/DL configuration to the UE in the case of a UE within a base station coverage, but in the case of an out of coverage (OOC) UE, since the UE is not connected to a base station, the base station cannot signal the changed UL/DL configuration to the UE. In this case, since the understanding of an SL resource between an in-coverage (INC) UE and an OOC UE is different, there may be a problem in that mutual communication becomes impossible. For example, in order to solve this problem, a V2X UE may transmit UL/DL configuration information configured by a base station to neighboring UEs using a PSBCH in an S-SSB signal.

In this case, for example, due to a limitation in the amount of data that can be transmitted by a PSBCH, the entire UL/DL configuration information configured by a base station may not be transmitted through the PSBCH. In the present disclosure, a method for efficiently transmitting UL/DL configuration information through a PSBCH is proposed under these prerequisites.

According to an embodiment of the present disclosure, a UL/DL configuration information configured by a base station may be composed of one or more patterns, and for each pattern: the UL/DL configuration may include the period at which the pattern is to be applied; the number of UL/DL slots in a period; information related to a reference SCS required to apply the number of each slot. For example, in SL communication, in order to minimize interference with DL communication, only a UL slot may be used as an SL slot.

According to an embodiment of the present disclosure, when a base station configures up to two patterns, a TDD configuration field transmitted through a PSBCH may consist of the number of patterns (X), a periodicity of patterns (Y), and the number of UL slots per pattern (Z). For example, a reference SCS may be determined by an implicit rule, predefined, pre-configured by higher layer signaling, or configured by higher layer signaling.

According to an embodiment of the present disclosure, a value X indicating the number of patterns may be expressed as shown in Table 5 using 1 bit.

TABLE 5

| X | Number of patterns |
|---|---|
| 0 | 1 |
| 1 | 2 |

According to an embodiment of the present disclosure, a value Y representing a maximum of two pattern periods may be expressed as Tables 6 and 7, respectively, using 4 bits according to the number of pattern periodicities.

TABLE 6

| Y (in decimal) | Periodicity |
|---|---|
| 0 | 0.5 |
| 1 | 0.625 |
| 2 | 1 |
| 3 | 1.25 |
| 4 | 2 |
| 5 | 2.5 |
| 6 | 4 |
| 7 | 5 |
| 8 | 10 |

Table 6 shows Y values according to the periodicity of the pattern when the number of pattern periods is one. For example, a case in which the number of pattern periods is one may refer to a case in which the value of X is 0.

TABLE 7

| Y (in decimal) | Periodicity of pattern 1 | Periodicity of pattern 2 |
|---|---|---|
| 0 | 0.5 | 0.5 |
| 1 | 0.625 | 0.625 |
| 2 | 1 | 1 |
| 3 | 0.5 | 2 |
| 4 | 2 | 0.5 |
| 5 | 1.25 | 1.25 |
| 6 | 1 | 3 |
| 7 | 3 | 1 |
| 8 | 2 | 2 |
| 9 | 1 | 4 |
| 10 | 4 | 1 |
| 11 | 2 | 3 |
| 12 | 3 | 2 |
| 13 | 2.5 | 2.5 |
| 14 | 5 | 5 |
| 15 | 10 | 10 |

Table 7 shows Y values according to the periodicities of the two patterns when the number of pattern periods is two. For example, a case in which the number of pattern periods is two may refer to a case in which the value of X is 1.

According to an embodiment of the present disclosure, when the X and Y values are determined and the reference SCS value is determined, when counting based on a reference SCS, the maximum number of UL slots that can be counted within the pattern 1 and pattern 2 periods may be determined. For example, assuming that $N_{P1}$ and $N_{P2}$ are the maximum number of countable UL slots within each period of pattern 1 and pattern 2 when counted based on units related to a reference SCS, the value Z of the number of UL slots configured for each of the two patterns may be expressed as shown in Table 8 using 7 bits.

TABLE 8

| Z (in decimal) | #UL slots in pattern 1 | #UL slots in pattern 2 |
|---|---|---|
| 0, . . . , $N_{P2}$ | 0 | 0, . . . , $N_{P2}$ |
| $N_{P2}$ + 1, . . . , 2* $N_{P2}$ + 1 | 1 | 0, . . . , $N_{P2}$ |
| 2* $N_{P2}$ + 2, . . . , 3* $N_{P2}$ + 2 | 2 | 0, . . . , $N_{P2}$ |
| . . . | . . . | . . . |
| k* $N_{P2}$ + k, . . . , (k + 1)* $N_{P2}$ + k | k | 0, . . . , $N_{P2}$ |
| . . . | . . . | . . . |
| $N_{P1}$* $N_{P2}$ + $N_{P1}$, . . . , ($N_{P1}$ + 1)* $N_{P2}$ + $N_{P1}$ | $N_{P1}$ | 0, . . . , $N_{P2}$ |

For example, the Z value may be expressed as Equation 1 below.

$$Z = n1*(N_{P2}+1)+n2 \quad \text{[Equation 1]}$$

For example, n1 and n2 may be the number of UL slots of pattern 1 and pattern 2 counted based on a reference SCS, respectively. For example, the n1 and n2 may be values to be transmitted through a PSBCH.

For example, it may be $$n1 = \left\lfloor \frac{m1}{\lambda} \right\rfloor, n2 = \left\lfloor \frac{m2}{\lambda} \right\rfloor.$$

For example, m1 and m2 are the number of UL slots constituting potential SL slots in relation to pattern 1 and pattern 2, respectively, and may be values determined by TDD-UL-DL-ConfigCommon. At this time, the number of UL slots constituting potential SL slots may be the number of slots including both the number of UL slots configured by TDD-UL-DL-ConfigCommon and the number of partial UL slots that satisfy the start and length conditions of SL symbols related to SL BWP configuration.

According to an embodiment of the present disclosure, assuming that the maximum number of slots in pattern 1 and pattern 2 configured by TDD-UL-DL-ConfigCommon is $M_{P1}$ and $M_{P2}$, respectively, in the above equation, the maximum values $N_{P1}$ and $N_{P2}$ of the number of slots in pattern 1 and pattern 2 related to SL-TDD-Config are calculated as in Equation 2 below.

$$N_{P1} = \left\lfloor \frac{M_{P1}}{\lambda} \right\rfloor, N_{P2} = \left\lfloor \frac{M_{P2}}{\lambda} \right\rfloor \quad \text{[Equation 2]}$$

Referring to Equation 2, in the equation, X may be a grouping factor, a parameter used to group the number of UL slots constituting the potential SL slot by the number of λ and count as one UL slot through the Z value constituting an SL-TDD-Config field in a PSBCH. For example, counting the number of UL slots by grouping as many as λ may mean counting λ UL slots as one UL slot based on a unit related to the grouping factor. For example, λ may include a value related to granularity. For example, in case of configuring a grouping factor using a reference SCS, when the numerology of a reference SCS configured in TDD-UL-DL-Config-Common is µ1 and the numerology of a reference SCS related to SL-TDD-Config transmitted over a PSBCH is µ2, the grouping factor λ may be defined as in Equation 3 below.

$$\lambda = 2^\mu = 2^{\mu2}/2_{\mu1} \quad \text{[Equation 3]}$$

Referring to Equation 3, µ may represent a relative numerology for the transformation of the two numerologies.

For example, when a Z value calculated by the Equation 1 is transmitted through SL-TDD-Config in a PSBCH, a receiving UE may calculate the number of UL slots to be used as potential SL slots based on Equation 4.

$$n1\_SL = \lambda \cdot \left\lfloor \frac{Z}{N_{P2}+1} \right\rfloor, \quad \text{[Equation 4]}$$

$$n2\_SL = \lambda \cdot (Z \bmod (N_{P2}+1))$$

Referring to Equation 4, n1_SL and n2_SL may represent the number of UL slots to be used as potential SL slots in pattern 1 and pattern 2, respectively.

According to an embodiment of the present disclosure, a Z value according to Table 8 may be expressed as Equation 5.

$$Z = n1*(N_P+1)+n2 \quad \text{[Equation 5]}$$

Here, $N_P$ may represent a greater or equal value among $N_{P1}$ and $N_{P2}$. For example, NP=max ($N_{P1}$, $N_{P2}$).

When a Z value calculated by Equation 5 is transmitted through SL-TDD-Config in a PSBCH, a receiving UE may calculate the number of UL slots to be used as potential SL slots based on Equation 6.

$$n1\_SL = \lambda \cdot \left\lfloor \frac{Z}{N_P+1} \right\rfloor, \quad \text{[Equation 6]}$$

$$n2\_SL = \lambda \cdot (Z \bmod (N_P+1))$$

Referring to Equation 6, n1_SL and n2_SL may represent the number of UL slots to be used as potential SL slots in pattern 1 and pattern 2, respectively.

For example, if only one pattern is configured, when SCS is 15 kHz, 30 kHz, 60 kHz, and/or 120 kHz, since the maximum number of UL slots is 80, it can be expressed within 7 bits. Accordingly, the number of configured UL slots can be expressed as a Z value as it is.

For example, in Table 8, the case in which a Z value is 0 is a case in which the number of UL slots configured in pattern 1 and pattern 2 is 0, that is, it is a case in which there is no UL transmission and only DL transmission is possible, in the time interval to which the corresponding UL/DL configuration is applied in the corresponding frequency band, configured by a base station.

According to an embodiment of the present disclosure, a Z value may be expressed as shown in Table 9 below.

TABLE 9

| Z (in decimal) | #UL slots in pattern 1 | #UL slots in pattern 2 |
| --- | --- | --- |
| $0, \ldots, N_{P2} - 1$ | 0 | $1, \ldots, N_{P2}$ |
| $N_{P2}, \ldots, 2*N_{P2}$ | 1 | $0, \ldots, N_{P2}$ |
| $2*N_{P2} + 1, \ldots, 3*N_{P2} + 1$ | 2 | $0, \ldots, N_{P2}$ |
| ... | ... | ... |
| $k*N_{P2} + k - 1, \ldots, (k + 1)*N_{P2} + k - 1$ | k | $0, \ldots, N_{P2}$ |
| ... | ... | ... |
| $N_{P1}*N_{P2} + N_{P1} - 1, \ldots, (N_{P1} + 1)*N_{P2} + N_{P1} - 1$ | $N_{P1}$ | $0, \ldots, N_{P2}$ |

Referring to Table 9, the Z value may be expressed as in Equation 7.

$$Z = n1*(N_{P2}+1)+n2-1 \quad \text{[Equation 7]}$$

For example, when a Z value calculated by Equation 7 is transmitted through SL-TDD-Config in a PSBCH, a receiving UE may calculate the number of UL slots to be used for potential SL slots based on Equation 8.

$$n1\_SL = \lambda \cdot \left\lfloor \frac{Z}{N_{P2}+1} \right\rfloor, \quad \text{[Equation 8]}$$
$$n2\_SL = \lambda \cdot ((Z+1) \bmod (N_{P2}+1))$$

Referring to Equation 8, n1_SL and n2_SL may represent the number of UL slots to be used as potential SL slots in pattern 1 and pattern 2, respectively.

According to an embodiment of the present disclosure, a Z value of Table 9 may be expressed as Equation 9.

$$Z = n1*(N_P+1)+n2-1 \quad \text{[Equation 9]}$$

Here, $N_P$ may represent a greater or equal value among $N_{P1}$ and $N_{P2}$. For example, $NP = \max(N_{P1}, N_{P2})$.

When a Z value calculated based on Equation 9 is transmitted through SL-TDD-Config in a PSBCH, a receiving UE may calculate the number of UL slots to be used for potential SL slots based on Equation 10.

$$n1\_SL = \lambda \cdot \left\lfloor \frac{Z}{N_P+1} \right\rfloor, \quad \text{[Equation 10]}$$
$$n2\_SL = \lambda \cdot ((Z+1) \bmod (N_P+1))$$

Referring to Equation 10, n1_SL and n2_SL may represent the number of UL slots to be used as potential SL slots in pattern 1 and pattern 2, respectively.

Figure 10:
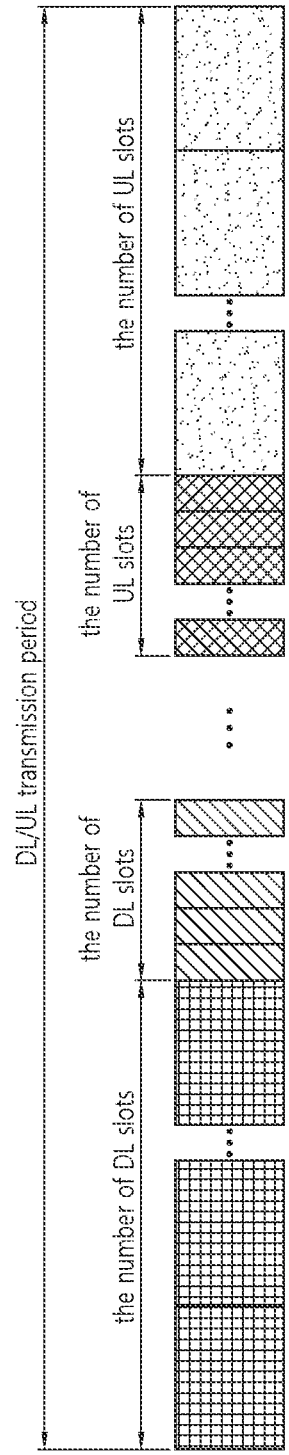
FIG. 10 shows a DL slot, a DL symbol, a UL slot, and a UL symbol allocated within a DL/UL period according to an embodiment of the present disclosure.

FIG. 10 shows a DL slot, a DL symbol, a UL slot, and a UL symbol allocated within a DL/UL period according to an embodiment of the present disclosure. The embodiment of FIG. 10 may be combined with various embodiments of the present disclosure.

Referring to FIG. 10, for example, a base station allocates as many UL resources as the number of UL slots configured through RRC signaling from the end point of each pattern, after then, it allocates as many UL resources as the number of UL symbols configured through RRC signaling from the last symbol of the previous slot of the first UL slot in a pattern. The above single or a plurality of patterns may be repeatedly applied in (summed) units of periodicities. For example, a UE receiving TDD-UL-DL configuration from a base station may know that DL resources and/or UL resources are allocated as shown in FIG. 10.

Figure 11:
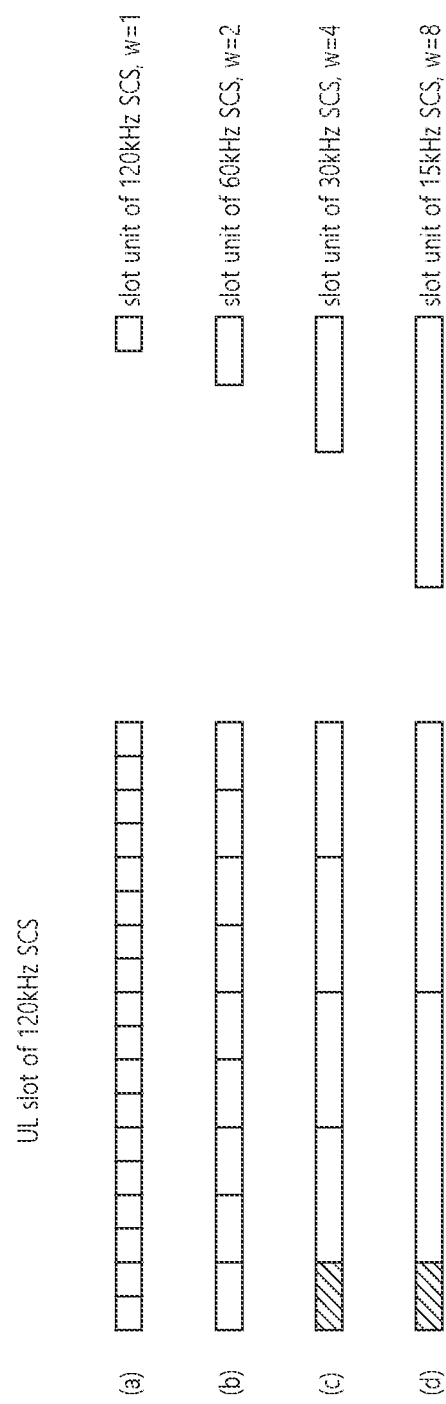
FIG. 11 shows a UL slot included in one pattern period according to TDD-UL-DL configuration according to an embodiment of the present disclosure.

FIG. 11 shows a UL slot included in one pattern period according to TDD-UL-DL configuration according to an embodiment of the present disclosure. The embodiment of FIG. 11 may be combined with various embodiments of the present disclosure.

Referring to FIG. 11, the number of potential SL slots, ie, UL slots, that a transmitting UE intends to deliver through a PSBCH may be the number of UL slots transmitted in SCS of 120 kHz. For example, if two patterns are configured according to TDD-UL-DL configuration, the number of UL slots may be included in information related to the number of UL slots in each period of the two patterns and transmitted through a PSBCH. For example, the information related to the number of UL slots in each period of the two patterns may include a value related to the number of UL slots in each period of the two patterns. For example, (a) to (d) of FIG. 11 may indicate a period of a first pattern according to TDD-UL-DL configuration. For example, in (a) of FIG. 11, the number of SL slots in a first pattern transmitted in SCS of 120 kHz may be n. In this case, a value related to the number of UL slots in a period of the first pattern may be n. For example, (b) of FIG. 11 may represent a case where a value w related to granularity is 2, based on the periodicities of two patterns according to the TDD-UL-DL configuration and the SCS (e.g., here, 120 kHz) related to SL communication. Here, the number of UL slots in the period of the first pattern is n, but may be counted in units of UL slots of 120 kHz/w=60 kHz. That is, the value related to the number of UL slots in a period of the first pattern may be an absolute value of n/2. For example, (c) of FIG. 11 may represent a case where a value w related to granularity is 4, based on the periodicities of two patterns according to the TDD-UL-DL configuration and the SCS (e.g., here, 120 kHz) related to SL communication. Here, the number of UL slots in the period of the first pattern is n, but may be counted in units of UL slots of 120 kHz/w=30 kHz. That is, the value related to the number of UL slots in a period of the first pattern may be an absolute value of n/4. For example, (d) of FIG. 11 may represent a case where a value w related to granularity is 8, based on the periodicities of two patterns according to the TDD-UL-DL configuration and the SCS (e.g., here, 120 kHz) related to SL communication. Here, the number of UL slots in the period of the first pattern is n, but may be counted in units of UL slots of 120 kHz/w=15 kHz. That is, the value related to the number of UL slots in a period of the first pattern may be an absolute value of n/8.

According to an embodiment of the present disclosure, TDD configuration information transmitted through a PSBCH may be pre-configured or configured by a base station to a UE through higher layer signaling such as RRC or MAC CE.

According to an embodiment of the present disclosure, an RRC parameter for the number of UL slots configured to a UE through a higher layer signaling may be determined by Table 10 below. For example, an index of Table 10 may be configured to a UE through a higher layer signaling. In this case, for example, a reference SCS applied to count the number of UL slots may be obtained by dividing an actual SL SCS value by $\lambda$, which is a grouping factor in Table 10.

According to an embodiment of the present disclosure, the number of UL slots can be counted based on b) reference SCS having a value smaller than a) reference SCS obtained based on Table 10, in this case, the actually applied b) reference SCS value, or information necessary to obtain the value may be configured or pre-configured by a base station to a UE through higher layer signaling such as RRC or MAC CE.

According to an embodiment of the present disclosure, a TDD configuration field of a reference SCS and a PSBCH may be (pre)configured by higher layer signaling. For example, in case of a single pattern in higher layer signaling, the reference SCS may be defined the same as the SL SCS. In the case of a double pattern, the reference SCS may be defined as a value obtained by dividing the SL SCS by the grouping factor λ.

Table 10 shows the grouping factors defined for a case of double pattern. For example, a reference SCS may be obtained based on Table 10. For example, a reference SCS in each case may be a value obtained by dividing the SL SCS by the grouping factor. For example, the reference SCS here may be a concept distinct from a reference SCS indicated on TDD-UL-DL configuration. For example, the unit of a slot in which the Y-th, (Y+1)-th, . . . , (Y+X−1)-th symbols in at least one slot are configured as UL symbols by UL/DL configuration of a base station. Or, for example, when UL symbols are continuously configured from the end of one slot, the UL slot signaled through a PSBCH may include a slot in which at least the Y-th symbol is configured as a UL symbol.

According to an embodiment of the present disclosure, 12 bits of an SL-TDD-config field to signal candidate (UL) resource information to which an SL resource pool bitmap is applied, through a PSBCH may be configured as shown in Table 11.

TABLE 11

For transmission of an S-SS/PSBCH block, a UE includes a bit sequence $a_0, a_1, a_2, a_3, \ldots, a_{11}$ in the PSBCH payload to indicate sl-TDD-Config-r16 and provide a slot format over a number of slots.
For paired spectrum, or if tdd-UL-DL-ConfigurationCommon and sl-TDD-Configuration-r16 are not provided for a spectrum indicated with only PC5 interface,
- $a_0, a_1, a_2, a_3, a_4, a_5, a_6, a_7, a_8, a_9, a_{10}, a_{11}$ are set to '1';
else
- $a_0 = 0$ if pattern1 is provided by tdd-UL-DL-ConfigurationCommon; $a_0 = 1$ if both pattern1 and pattern2 are provided by tdd-UL-DL-ConfigurationCommon
- $a_1, a_2, a_3, a_4$ are determined based on
  - P in pattern1 as described in Table 16.1-1 for $a_0 = 0$
  - P in pattern1 and $P_2$ in pattern2 as described in Table 16.1-2 for $a_0 = 1$
  where P and $P_2$ are the period of the first and the second pattern respectively.
- $a_5, a_6, a_7, a_8, a_9, a_{10}, a_{11}$ are the 7th to 1st LSBs of $u_{slots}^{SL}$, respectively

- for $a_0 = 0$, $u_{slots}^{SL} = u_{slots} * 2^{\mu-\mu_{ref}} + \left\lfloor \dfrac{u_{sym} * 2^{\mu-\mu_{ref}}}{L} \right\rfloor + I_1$

- for $a_0 = 1$, $u_{slots}^{SL} = \left\lfloor \dfrac{u_{slots,2} * 2^{\mu-\mu_{ref}} + \left\lfloor \dfrac{u_{sym,2} * 2^{\mu-\mu_{ref}}}{L} \right\rfloor + I_2}{w} \right\rfloor *$
$\left\lceil \dfrac{P * 2^\mu + 1}{w} \right\rceil + \left\lfloor \dfrac{u_{slots} * 2^{\mu-\mu_{ref}} + \left\lfloor \dfrac{u_{sym} * 2^{\mu-\mu_{ref}}}{L} \right\rfloor + I_1}{w} \right\rfloor$ where
- L is the number of symbols in a slot: L = 12 if cyclicPrefix-SL = "ECP"; else, L = 14
- $I_1$ is 1 if $u_{sym} * 2^{\mu-\mu_{ref}} \mod L \geq L - Y$, else $I_1$ is 0
- $I_2$ is 1 if $u_{sym,2} * 2^{\mu-\mu_{ref}} \mod L \geq L - Y$, else $I_2$ is 0
- Y is the sidelink starting symbol index provided by sl-StartSymbol
- w is the granularity of slots indication as described in Table 16.1-2
- $\mu_{ref}, u_{slots}, u_{sym}, u_{slots,2}, u_{sym,2}$ are the numerology of the reference SCS, the number of UL slots and symbols in the first pattern, and the number of UL slots and symbols in the second pattern respectively
$\mu = 0, 1, 2, 3$ corresponds to SL SCS 15, 30, 60, 120 kHz respectively.

related to the reference SCS may be a unit defined to indicate the number of slots in a plurality of patterns within a limited number of bits.

TABLE 10

| SL SCS (kHz), Y | Grouping factor (λ) |
| --- | --- |
| (120, 15) | 8 |
| (60, 15) | 4 |
| (120, 14) | |
| (30, 15) | 2 |
| (60, 14) | |
| (120, [6, . . . , 13]) | |
| Other cases | 1 |

According to an embodiment of the present disclosure, a UL slot signaled through a PSBCH may include a slot including the position and number of SL symbols defined in SL BWP configuration. That is, for example, assuming that X and Y are the number of SL symbols defined in SL BWP configuration, and the start index of the SL symbols, respectively, a UL slot signaled through a PSBCH may include a Table 12 represents 4 bits related to a period of a pattern included in a PSBCH, and a period of the pattern the 4 bits represents, when only one pattern is configured.

TABLE 12

| | Slot configuration period of pattern1 |
| $a_1, a_2, a_3, a_4$ | P (msec) |
| --- | --- |
| 0, 0, 0, 0 | 0.5 |
| 0, 0, 0, 1 | 0.625 |
| 0, 0, 1, 0 | 1 |
| 0, 0, 1, 1 | 1.25 |
| 0, 1, 0, 0 | 2 |
| 0, 1, 0, 1 | 2.5 |
| 0, 1, 1, 0 | 4 |
| 0, 1, 1, 1 | 5 |
| 1, 0, 0, 0 | 10 |
| Reserved | Reserved |

Table 13 shows 4 bits related to the period of each pattern included in a PSBCH when two patterns are configured.

And, it shows a value related to the period of each pattern indicated by the 4 bits and the granularity related to SL SCS.

TABLE 13

| $a_1, a_2,$ $a_3, a_4$ | Slot configuration period of pattern1 P (msec) | Slot configuration period of pattern2 $P_2$ (msec) | Granularity w in slots with different SCS | | | |
|---|---|---|---|---|---|---|
| | | | 15 kHz | 30 kHz | 60 kHz | 120 kHz |
| 0, 0, 0, 0 | 0.5 | 0.5 | | 1 | | |
| 0, 0, 0, 1 | 0.625 | 0.625 | | | | |
| 0, 0, 1, 0 | 1 | 1 | | | | |
| 0, 0, 1, 1 | 0.5 | 2 | | | | |
| 0, 1, 0, 0 | 1.25 | 1.25 | | | | |
| 0, 1, 0, 1 | 2 | 0.5 | | | | |
| 0, 1, 1, 0 | 1 | 3 | | 1 | | 2 |
| 0, 1, 1, 1 | 2 | 2 | | | | |
| 1, 0, 0, 0 | 3 | 1 | | | | |
| 1, 0, 0, 1 | 1 | 4 | | | | |
| 1, 0, 1, 0 | 2 | 3 | | | | |
| 1, 0, 1, 1 | 2.5 | 2.5 | | | | |
| 1, 1, 0, 0 | 3 | 2 | | | | |
| 1, 1, 0, 1 | 4 | 1 | | | | |
| 1, 1, 1, 0 | 5 | 5 | | 1 | 2 | 4 |
| 1, 1, 1, 1 | 10 | 10 | 1 | 2 | 4 | 8 |

According to an embodiment of the present disclosure, SL-TDD-config may be a signaling field that determines a candidate (UL) resource to which an SL resource pool bitmap is applied based on TDD-UL-DL-Configuration-Common configured by an NR network, when NR-V2X communication is performed in an NR carrier. For example, if an NR-V2X UE operates on an LTE carrier, the NR-V2X UE should be able to signal based on UL/DL configuration defined by an LTE network. Table 14 shows an embodiment of a UL/DL configuration defined by an LTE network.

TABLE 14

| Uplink-downlink config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 14, when the LTE UL/DL configuration is 0, 1, 2, or 3, in the case where two patterns are configured in each of SL-TDD-config fields, a combination (P, P1) of the two patterns can be signaled as (P=5, P2=5), (P=4, P2=1), (P=3, P2=2). However, for example, if an LTE UL/DL configuration is 4, 5, or 6, when the pattern is configured to two, signaling may not be possible with the SL-TDD-config field. Therefore, for example, if an LTE UL/DL configuration is 0, 1, 2, or 3, a (P, P2) combination corresponding to a case in which two patterns are configured among SL-TDD-config code points is signaled, and if an LTE UL/DL configuration is 4, 5, or 6, among the SL-TDD-config code points, for the case where only one pattern is configured, it can be signaled using 3 code points among 7 reserved code points that are not used.

Table 15 shows code points and corresponding periods related to each case of UL/DL configuration, when an NR-V2X UE needs to signal based on the UL/DL configuration defined by an LTE network. For example, an SL-TDD-config may include the following a1, a2, a3, a4.

TABLE 15

| $a_1, a_2, a_3, a_4$ | Slot configuration period of pattern1 P (msec) |
|---|---|
| 0, 0, 0, 0 | 0.5 |
| 0, 0, 0, 1 | 0.625 |
| 0, 0, 1, 0 | 1 |
| 0, 0, 1, 1 | 1.25 |
| 0, 1, 0, 0 | 2 |
| 0, 1, 0, 1 | 2.5 |
| 0, 1, 1, 0 | 4 |
| 0, 1, 1, 1 | 5 |
| 1, 0, 0, 0 | 10 |
| 1, 0, 0, 1 | LTE UL-DL configuration = 4 |
| 1, 0, 1, 0 | LTE UL-DL configuration = 5 |
| 1, 0, 1, 1 | LTE UL-DL configuration = 6 |
| Reserved | Reserved |

In the present disclosure, a method in which a UE transmits a UL/DL TDD configuration configured by a base station through a PSBCH that transmits a limited amount of data for SL communication is proposed. For example, in the above description, a reference SCS may be configured through higher layer signaling or may be determined by an implicit rule. In addition, in the present disclosure, a method of expressing the number of UL slots configured in a maximum of two patterns using a limited number of bits has been proposed. For example, various embodiments described in the present disclosure may be combined with each other.

Figure 12:
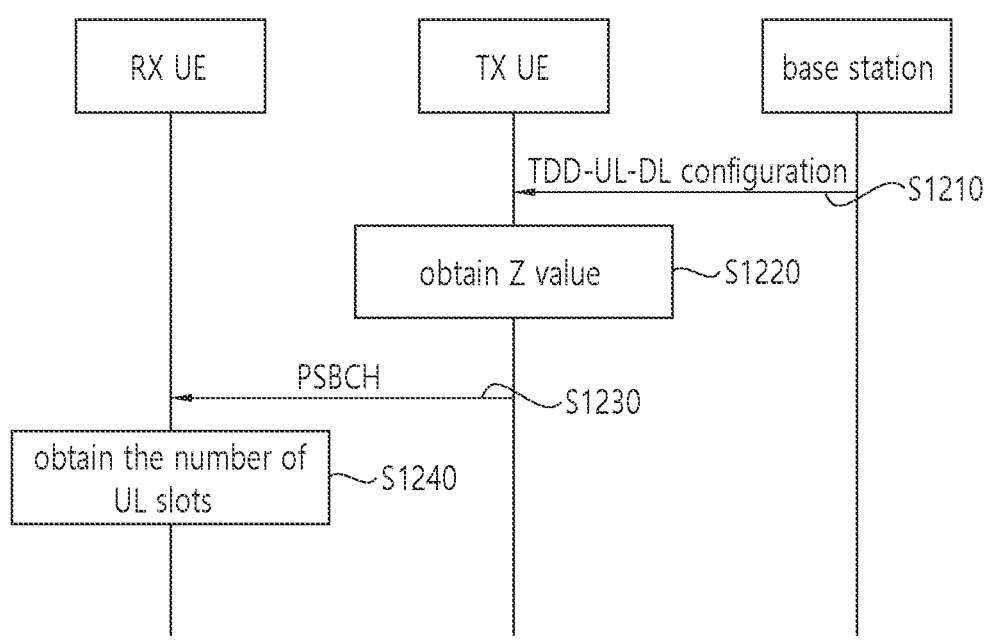
FIG. 12 shows a procedure in which a transmitting UE transmits a PSBCH to a receiving UE according to an embodiment of the present disclosure.

FIG. 12 shows a procedure in which a transmitting UE transmits a PSBCH to a receiving UE according to an embodiment of the present disclosure. The embodiment of FIG. 12 may be combined with various embodiments of the present disclosure.

Referring to FIG. 12, in step S1210, a base station may transmit TDD-UL-DL configuration information to a transmitting UE. For example, the TDD-UL-DL configuration information may include information related to a plurality of UL TDD patterns. For example, the plurality of UL TDD patterns may be configured as two patterns. The information related to the UL TDD pattern may include at least one of information related to a UL slot, information related to a UL symbol, and/or information related to a periodicity of a UL TDD pattern. In step S1220, a transmitting UE may obtain a Z value based on the information related to the plurality of UL TDD patterns and the SCS related to SL communication. For example, the Z value may be a value expressed by 4 bits of information related to each UL slot within a period of the two patterns. For example, the Z value may be obtained based on a value related to granularity or a grouping factor λ. For example, the value related to the granularity may be determined based on the SCS related to the SL communication and the periodicity of each of the plurality of UL TDD patterns. For example, the Z value may include information related to the number of UL slots in each period of the plurality of UL TDD patterns. The number of UL slots may include the number of slots counted in units of slots related to an SCS that is equal to or lower than an SCS related to the SL communication. In step S1230, a transmitting UE may transmit a PSBCH to a receiving UE. For example, the PSBCH may include the Z value. In step S1240, a receiving UE may receive information related to a UL slot in each period of a plurality of UL TDD patterns through the PSBCH. For example, the receiving UE may obtain the number of UL slots in each period of the plurality of UL TDD patterns based on information related to UL slots in each period of the plurality of UL TDD patterns. For example, the number of UL slots may be potential SL slots that can be used for the SL communication.

Figure 13:
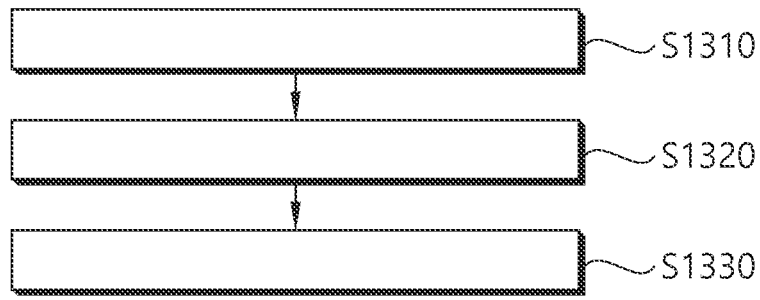
FIG. 13 shows a procedure in which a first device performs wireless communication, according to an embodiment of the present disclosure.

FIG. 13 shows a procedure in which a first device performs wireless communication, according to an embodiment of the present disclosure. The embodiment of FIG. 13 may be combined with various embodiments of the present disclosure.

Referring to FIG. 13, in step S1310, a first device may receive a TDD-UL-DL configuration information, from a base station, including information related to a first slot pattern and information related to a second slot pattern. For example, the information related to the first slot pattern may include information related to a periodicity of the first slot pattern and information related to a first UL resource, and the information related to the second slot pattern may include information related to a periodicity of the second slot pattern and information related to a second UL resource. In step S1320, the first device may determine a value related to granularity, based on i) the periodicity of the first slot pattern, ii) the periodicity of the second slot pattern and iii) a first subcarrier spacing (SCS) related to SL communication. In step S1330, the first device may transmit a physical sidelink broadcast channel (PSBCH), to a second device, including information related to the first UL resource and information related to the second UL resource. For example, the information related to the first UL resource and information related to the second UL resource may be expressed based on a unit related to a second SCS, and the second SCS may be obtained based on a value obtained by dividing the first SCS by the value related to the granularity.

For example, based on a sum of the periodicity of the first slot pattern and the periodicity of the second slot pattern being 4 ms and the first SCS being 120 kHz, the value related to the granularity may be 2.

For example, based on a sum of the periodicity of the first slot pattern and the periodicity of the second slot pattern being 5 ms, and the first SCS being 120 kHz, the value related to the granularity may be 2.

For example, based on the periodicity of the first slot pattern being 5 ms, the periodicity of the second slot pattern being 5 ms, and the first SCS being 60 kHz, the value related to the granularity may be 2.

For example, based on the periodicity of the first slot pattern being 10 ms, the periodicity of the second slot pattern being 10 ms, and the first SCS being 30 kHz, the value related to the granularity may be 2.

For example, based on the periodicity of the first slot pattern being 5 ms, the periodicity of the second slot pattern being 5 ms, and the first SCS being 120 kHz, the value related to the granularity may be 4.

For example, based on the periodicity of the first slot pattern being 10 ms, the periodicity of the second slot pattern being 10 ms, and the first SCS being 60 kHz, the value related to the granularity may be 4.

For example, based on the periodicity of the first slot pattern being 10 ms, the periodicity of the second slot pattern being 10 ms, and the first SCS being 120 kHz, the value related to the granularity may be 8.

For example, information related to the first UL resource may include a number of slots related to the first UL resource, and information related to the second UL resource may include a number of slots related to the second UL resource.

For example, the information related to the first UL resource and the information related to the second UL resource, included in the PSBCH may be expressed by 7 bits.

For example, the information related to the first UL resource and the information related to the second UL resource may be expressed based on a maximum number of UL slots which can exist in a period of the first slot pattern, expressed based on an unit related to the second SCS.

For example, the information related to the first UL resource and the information related to the second UL resource may be expressed as a sum of: a number of slots related to the first UL resource expressed based on the unit related to the second SCS; and a value obtained by multiplying a value obtained by adding 1 to the maximum number of UL slots which can exist in the period of the first slot pattern, expressed based on the unit related to the second SCS, by a number of slots related to the second UL resource expressed based on the unit related to the second SCS.

For example, the information related to the first UL resource and the information related to the second UL resource may be expressed as a sum of: a value obtained by subtracting 1 from a number of slots related to the first UL resource expressed based on the unit related to the second SCS; and a value obtained by multiplying a value obtained by adding 1 to the maximum number of UL slots which can exist in the period of the first slot pattern, expressed based on the unit related to the second SCS, by a number of slots related to the second UL resource expressed based on the unit related to the second SCS.

The above-described embodiment may be applied to various devices to be described below. For example, a processor 102 of a first device 100 may control a transceiver 106 to receive a TDD-UL-DL configuration information, from a base station, including information related to a first slot pattern and information related to a second slot pattern. For example, the information related to the first slot pattern may include information related to a periodicity of the first slot pattern and information related to a first UL resource, and the information related to the second slot pattern may include information related to a periodicity of the second slot pattern and information related to a second UL resource. And, the processor 102 of the first device 100 may determine a value related to granularity, based on i) the periodicity of the first slot pattern, ii) the periodicity of the second slot pattern and iii) a first subcarrier spacing (SCS) related to SL communication. And, the processor 102 of the first device 100 may control the transceiver 106 to transmit a physical sidelink broadcast channel (PSBCH), to a second device 200, including information related to the first UL resource and information related to the second UL resource. For example, the information related to the first UL resource and information related to the second UL resource may be expressed based on a unit related to a second SCS, and the second SCS may be obtained based on a value obtained by dividing the first SCS by the value related to the granularity.

According to an embodiment of the present disclosure, a first device for performing wireless communication may be proposed. For example, the first device may comprise: one or more memories storing instructions; one or more transceivers; and one or more processors connected to the one or more memories and the one or more transceivers. For example, the one or more processors may execute the instructions to: receive a TDD-UL-DL configuration information, from a base station, including information related to a first slot pattern and information related to a second slot pattern, wherein the information related to the first slot pattern may include information related to a periodicity of the first slot pattern and information related to a first UL resource, and wherein the information related to the second slot pattern may include information related to a periodicity of the second slot pattern and information related to a second UL resource; determine a value related to granularity, based on i) the periodicity of the first slot pattern, ii) the periodicity of the second slot pattern and iii) a first subcarrier spacing (SCS) related to SL communication; and transmit a physical sidelink broadcast channel (PSBCH), to a second device, including information related to the first UL resource and information related to the second UL resource, wherein the information related to the first UL resource and information related to the second UL resource may be expressed based on a unit related to a second SCS, and wherein the second SCS may be obtained based on a value obtained by dividing the first SCS by the value related to the granularity.

According to an embodiment of the present disclosure, a device adapted to control a first user equipment (UE) may be proposed. For example, the device may comprise: one or more processors; and one or more memories operably connectable to the one or more processors and storing instructions. For example, the one or more processors may execute the instructions to: receive a TDD-UL-DL configuration information, from a base station, including information related to a first slot pattern and information related to a second slot pattern, wherein the information related to the first slot pattern may include information related to a periodicity of the first slot pattern and information related to a first UL resource, and wherein the information related to the second slot pattern may include information related to a periodicity of the second slot pattern and information related to a second UL resource; determine a value related to granularity, based on i) the periodicity of the first slot pattern, ii) the periodicity of the second slot pattern and iii) a first subcarrier spacing (SCS) related to SL communication; and transmit a physical sidelink broadcast channel (PSBCH), to a second UE, including information related to the first UL resource and information related to the second UL resource, wherein the information related to the first UL resource and information related to the second UL resource may be expressed based on a unit related to a second SCS, and wherein the second SCS may be obtained based on a value obtained by dividing the first SCS by the value related to the granularity.

According to an embodiment of the present disclosure, a non-transitory computer-readable storage medium storing instructions may be proposed. For example, the instructions, when executed, may cause a first device to: receive a TDD-UL-DL configuration information, from a base station, including information related to a first slot pattern and information related to a second slot pattern, wherein the information related to the first slot pattern may include information related to a periodicity of the first slot pattern and information related to a first UL resource, and wherein the information related to the second slot pattern may include information related to a periodicity of the second slot pattern and information related to a second UL resource; determine a value related to granularity, based on i) the periodicity of the first slot pattern, ii) the periodicity of the second slot pattern and iii) a first subcarrier spacing (SCS) related to SL communication; and transmit a physical sidelink broadcast channel (PSBCH), to a second device, including information related to the first UL resource and information related to the second UL resource, wherein the information related to the first UL resource and information related to the second UL resource may be expressed based on a unit related to a second SCS, and wherein the second SCS may be obtained based on a value obtained by dividing the first SCS by the value related to the granularity.

Figure 14:
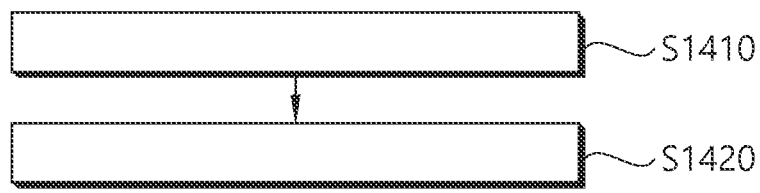
FIG. 14 shows a procedure in which a second device performs wireless communication, according to an embodiment of the present disclosure.

FIG. 14 shows a procedure in which a second device performs wireless communication, according to an embodiment of the present disclosure. The embodiment of FIG. 14 may be combined with various embodiments of the present disclosure.

Referring to FIG. 14, in step S1410, a second device may receive a physical sidelink broadcast channel (PSBCH), from a first device, including information related to a first uplink (UL) resource and information related to a second UL resource. For example, the information related to the first UL resource and the information related to the second UL resource may be expressed based on an unit related to a second subcarrier spacing (SCS). In step S1420, the second device may perform sidelink (SL) communication based on the information related to the first UL resource and the information related to the second UL resource. For example, the second SCS may be obtained based on a value obtained by dividing a first SCS related to the SL communication by a value related to granularity, and the value related to granularity may be determined based on i) a periodicity of a first slot pattern related to the first UL resource, ii) a periodicity of a second slot pattern related to the second UL resource and iii) the first SCS.

For example, the information related to the first UL resource may include a number of slots related to the first UL resource, and the information related to the second UL resource may include a number of slots related to the second UL resource.

The above-described embodiment may be applied to various devices to be described below. For example, a processor 202 of a second device 200 may control a transceiver 206 to receive a physical sidelink broadcast channel (PSBCH), from a first device 100, including information related to a first uplink (UL) resource and information related to a second UL resource. For example, the information related to the first UL resource and the information related to the second UL resource may be expressed based on an unit related to a second subcarrier spacing (SCS). And, the processor 202 of a second device 200 may control the transceiver 206 to perform sidelink (SL) communication based on the information related to the first UL resource and the information related to the second UL resource. For example, the second SCS may be obtained based on a value obtained by dividing a first SCS related to the SL communication by a value related to granularity, and the value related to granularity may be determined based on i) a periodicity of a first slot pattern related to the first UL resource, ii) a periodicity of a second slot pattern related to the second UL resource and iii) the first SCS.

According to an embodiment of the present disclosure, a second device for performing wireless communication may be proposed. For example, the second device may comprise: one or more memories storing instructions; one or more transceivers; and one or more processors connected to the one or more memories and the one or more transceivers. For example, the one or more processors may execute the instructions to: receive a physical sidelink broadcast channel (PSBCH), from a first device, including information related to a first uplink (UL) resource and information related to a second UL resource, wherein the information related to the first UL resource and the information related to the second UL resource may be expressed based on an unit related to a second subcarrier spacing (SCS); and perform sidelink (SL) communication based on the information related to the first UL resource and the information related to the second UL resource, wherein the second SCS may be obtained based on a value obtained by dividing a first SCS related to the SL communication by a value related to granularity, and wherein the value related to granularity may be determined based on i) a periodicity of a first slot pattern related to the first UL resource, ii) a periodicity of a second slot pattern related to the second UL resource and iii) the first SCS.

For example, the information related to the first UL resource may include a number of slots related to the first UL resource, and wherein the information related to the second UL resource may include a number of slots related to the second UL resource.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 15:
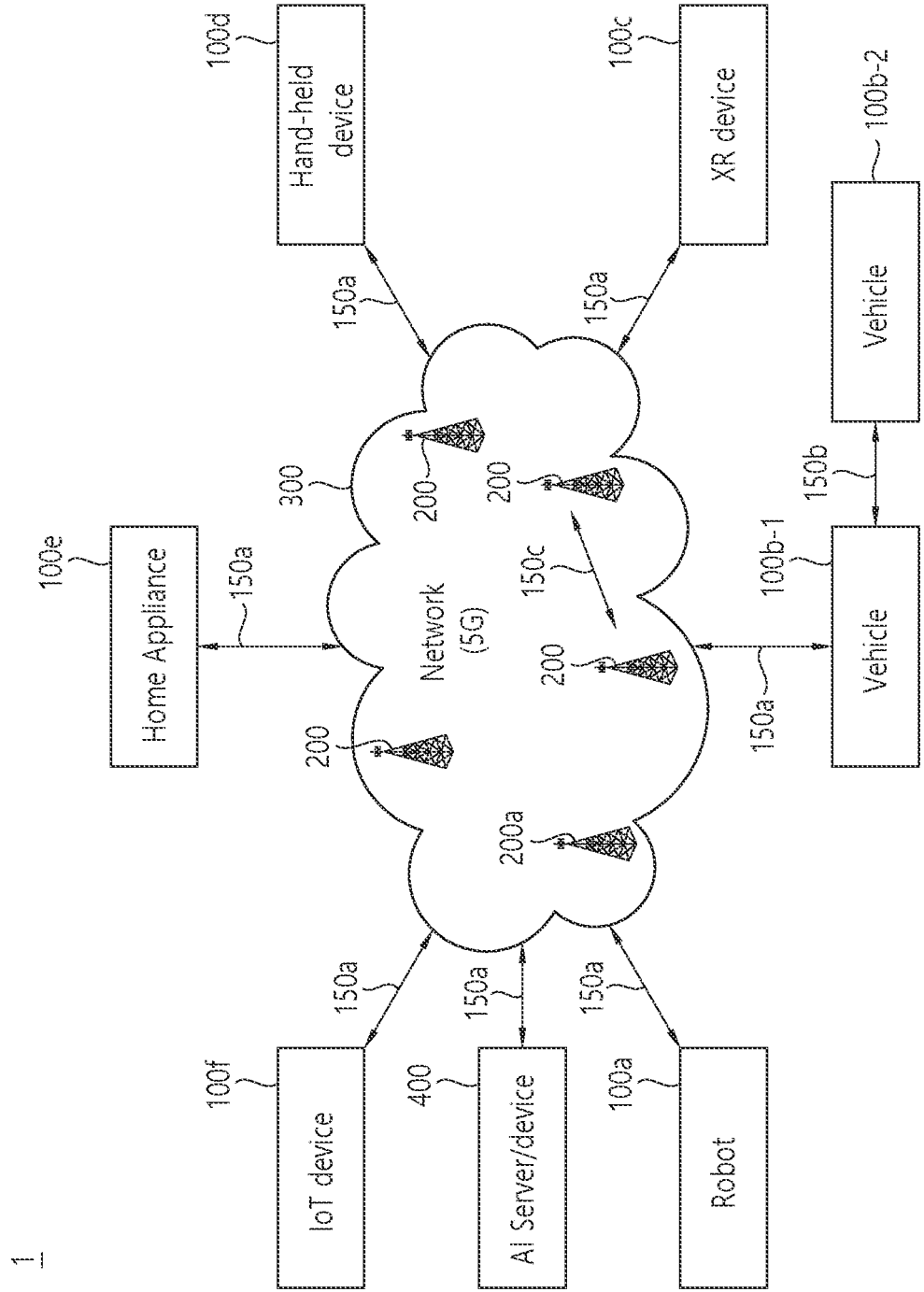
FIG. 15 shows a communication system 1, based on an embodiment of the present disclosure.

FIG. 15 shows a communication system 1, based on an embodiment of the present disclosure. The embodiment of FIG. 15 may be combined with various embodiments of the present disclosure.

Referring to FIG. 15, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 16:
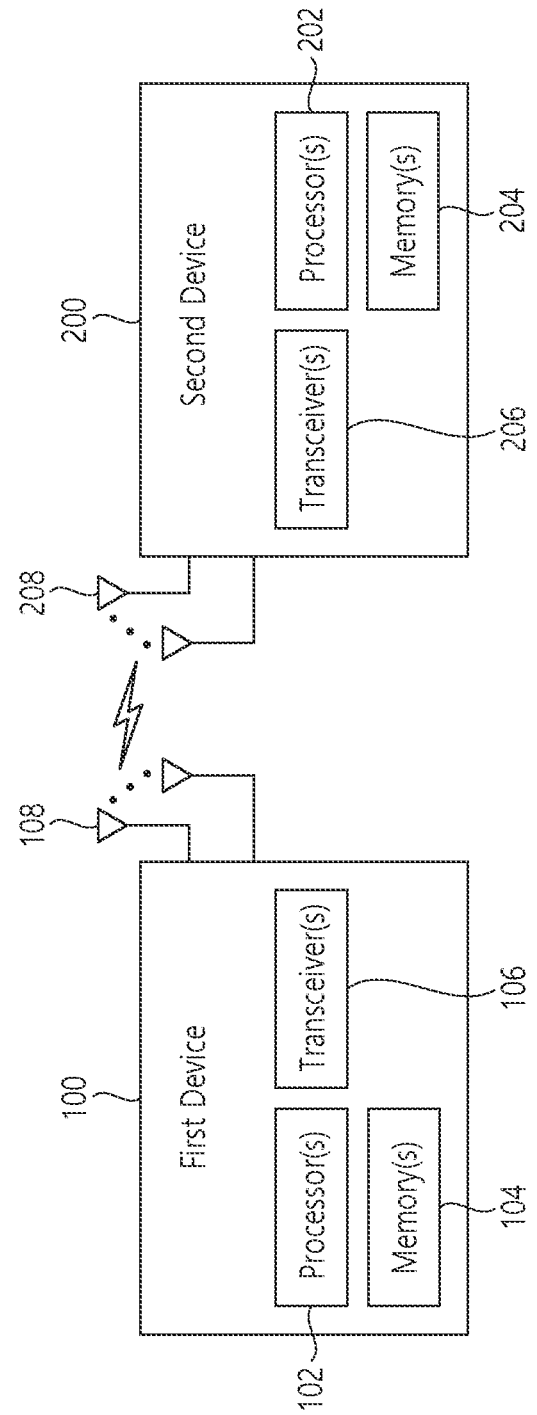
FIG. 16 shows wireless devices, based on an embodiment of the present disclosure.

FIG. 16 shows wireless devices, based on an embodiment of the present disclosure.

Referring to FIG. 16, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 15.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMS), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 17:
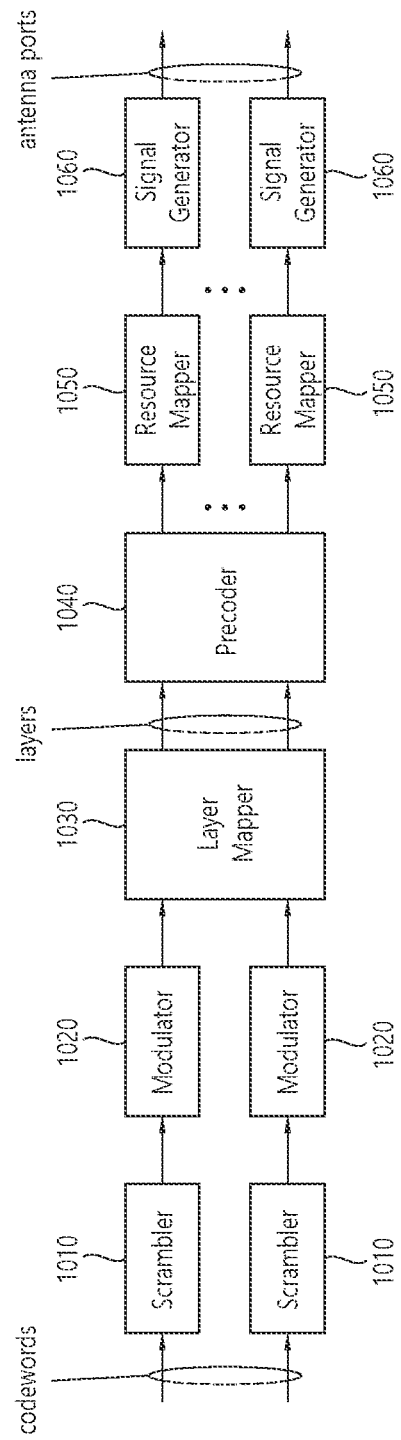
FIG. 17 shows a signal process circuit for a transmission signal, based on an embodiment of the present disclosure.

FIG. 17 shows a signal process circuit for a transmission signal, based on an embodiment of the present disclosure.

Referring to FIG. 17, a signal processing circuit 1000 may include scramblers 1010, modulators 1020, a layer mapper 1030, a precoder 1040, resource mappers 1050, and signal generators 1060. An operation/function of FIG. 17 may be performed, without being limited to, the processors 102 and 202 and/or the transceivers 106 and 206 of FIG. 16. Hardware elements of FIG. 17 may be implemented by the processors 102 and 202 and/or the transceivers 106 and 206 of FIG. 16. For example, blocks 1010 to 1060 may be implemented by the processors 102 and 202 of FIG. 16. Alternatively, the blocks 1010 to 1050 may be implemented by the processors 102 and 202 of FIG. 16 and the block 1060 may be implemented by the transceivers 106 and 206 of FIG. 16.

Codewords may be converted into radio signals via the signal processing circuit 1000 of FIG. 17. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 17. For example, the wireless devices (e.g., 100 and 200 of FIG. 16) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 18:
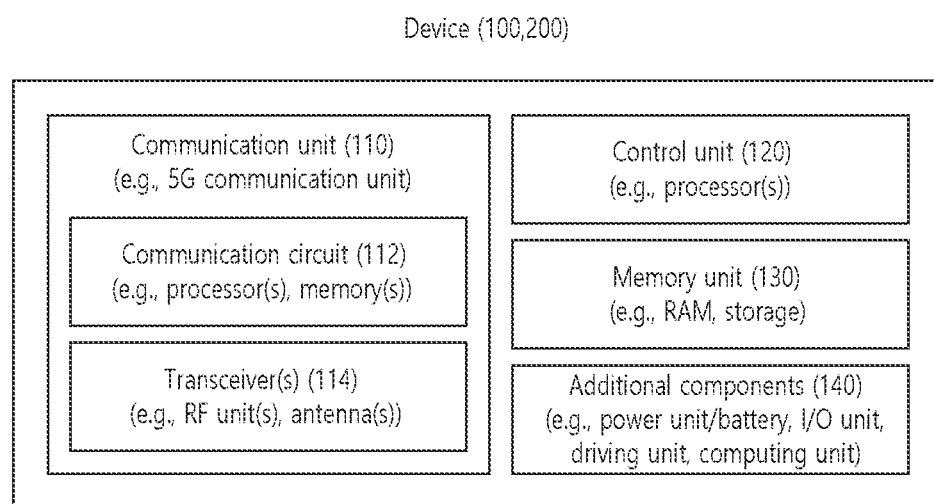
FIG. 18 shows another example of a wireless device, based on an embodiment of the present disclosure.

FIG. 18 shows another example of a wireless device, based on an embodiment of the present disclosure. The wireless device may be implemented in various forms according to a use-case/service (refer to FIG. 15).

Referring to FIG. 18, wireless devices 100 and 200 may correspond to the wireless devices 100 and 200 of FIG. 16 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 16. For example, the transceiver(s) 114 may include the one or more transceivers 106 and 206 and/or the one or more antennas 108 and 208 of FIG. 16. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 15), the vehicles (100b-1 and 100b-2 of FIG. 15), the XR device (100c of FIG. 15), the hand-held device (100d of FIG. 15), the home appliance (100e of FIG. 15), the IoT device (100f of FIG. 15), a digital broadcast terminal, a hologram device, a public safety device, an MTC device, a medicine device, a fintech device (or a finance device), a security device, a climate/environment device, the AI server/device (400 of FIG. 15), the BSs (200 of FIG. 15), a network node, etc. The wireless device may be used in a mobile or fixed place according to a use-example/service.

In FIG. 18, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 18 will be described in detail with reference to the drawings.

Figure 19:
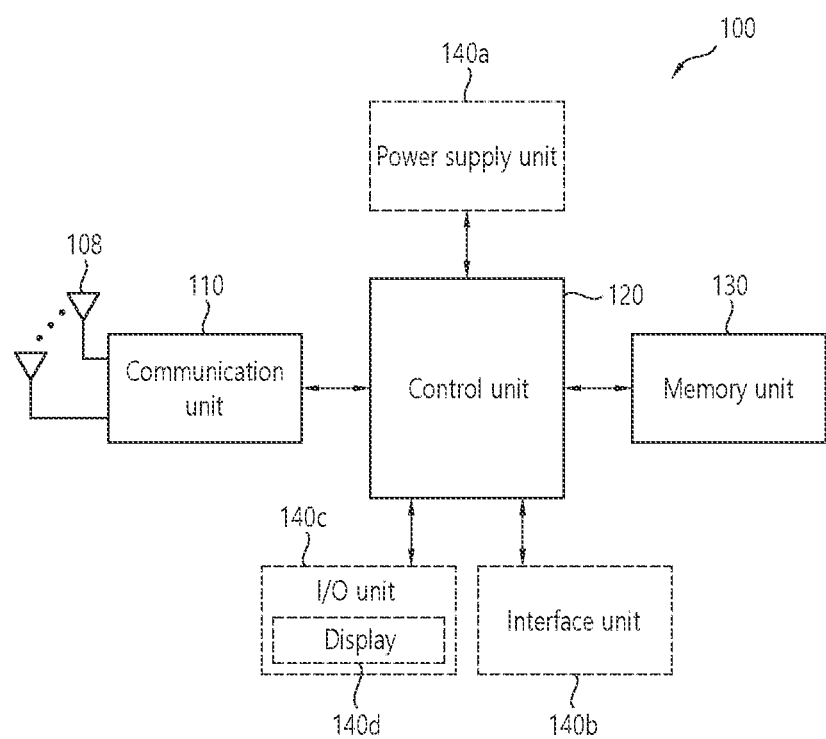
FIG. 19 shows a hand-held device, based on an embodiment of the present disclosure.

FIG. 19 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 19, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 18, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 20:
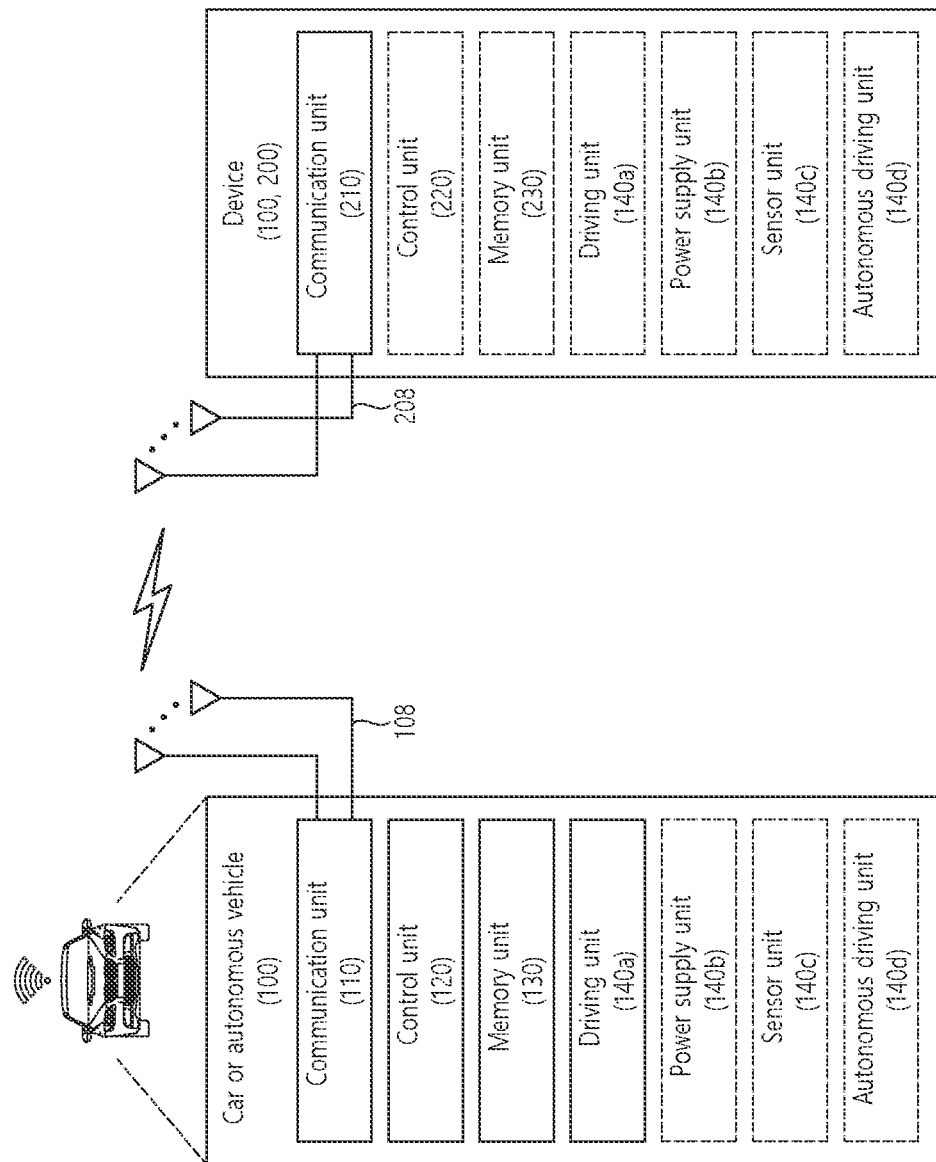
FIG. 20 shows a vehicle or an autonomous vehicle, based on an embodiment of the present disclosure.

FIG. 20 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 20, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 18, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, by a first device, wireless communication, the method comprising:
   receiving a TDD-UL-DL configuration information, from a base station, including information related to a first slot pattern and information related to a second slot pattern,
   wherein the information related to the first slot pattern includes information related to a periodicity of the first slot pattern and information related to a first UL resource, and
   wherein the information related to the second slot pattern includes information related to a periodicity of the second slot pattern and information related to a second UL resource;
   determining a value related to granularity, based on i) the periodicity of the first slot pattern, ii) the periodicity of the second slot pattern and iii) a first subcarrier spacing (SCS) related to SL communication; and
   transmitting a physical sidelink broadcast channel (PSBCH), to a second device, including information related to the first UL resource and information related to the second UL resource,
   wherein the information related to the first UL resource and information related to the second UL resource are expressed based on a unit related to a second SCS, and
   wherein the second SCS is obtained based on a value obtained by dividing the first SCS by the value related to the granularity.

2. The method of claim 1, wherein based on a sum of the periodicity of the first slot pattern and the periodicity of the second slot pattern being 4 ms and the first SCS being 120 kHz, the value related to the granularity is 2.

3. The method of claim 1, wherein based on a sum of the periodicity of the first slot pattern and the periodicity of the second slot pattern being 5 ms, and the first SCS being 120 kHz, the value related to the granularity is 2.

4. The method of claim 1, wherein based on the periodicity of the first slot pattern being 5 ms, the periodicity of the second slot pattern being 5 ms, and the first SCS being 60 kHz, the value related to the granularity is 2.

5. The method of claim 1, wherein based on the periodicity of the first slot pattern being 10 ms, the periodicity of the second slot pattern being 10 ms, and the first SCS being 30 kHz, the value related to the granularity is 2.

6. The method of claim 1, wherein based on the periodicity of the first slot pattern being 5 ms, the periodicity of the second slot pattern being 5 ms, and the first SCS being 120 kHz, the value related to the granularity is 4.

7. The method of claim 1, wherein based on the periodicity of the first slot pattern being 10 ms, the periodicity of the second slot pattern being 10 ms, and the first SCS being 60 kHz, the value related to the granularity is 4.

8. The method of claim 1, wherein based on the periodicity of the first slot pattern being 10 ms, the periodicity of the second slot pattern being 10 ms, and the first SCS being 120 kHz, the value related to the granularity is 8.

9. The method of claim 1, wherein information related to the first UL resource includes a number of slots related to the first UL resource, and
   wherein information related to the second UL resource includes a number of slots related to the second UL resource.

10. The method of claim 1, wherein the information related to the first UL resource and the information related to the second UL resource, included in the PSBCH are expressed by 7 bits.

11. The method of claim 10, wherein the information related to the first UL resource and the information related to the second UL resource are expressed based on a maximum number of UL slots which can exist in a period of the first slot pattern, expressed based on an unit related to the second SCS.

12. The method of claim 11, wherein the information related to the first UL resource and the information related to the second UL resource is expressed as a sum of:
   a number of slots related to the first UL resource expressed based on the unit related to the second SCS; and
   a value obtained by multiplying a value obtained by adding 1 to the maximum number of UL slots which can exist in the period of the first slot pattern, expressed based on the unit related to the second SCS, by a number of slots related to the second UL resource expressed based on the unit related to the second SCS.

13. The method of claim 11, wherein the information related to the first UL resource and the information related to the second UL resource is expressed as a sum of:
- a value obtained by subtracting 1 from a number of slots related to the first UL resource expressed based on the unit related to the second SCS; and
- a value obtained by multiplying a value obtained by adding 1 to the maximum number of UL slots which can exist in the period of the first slot pattern, expressed based on the unit related to the second SCS, by a number of slots related to the second UL resource expressed based on the unit related to the second SCS.

14. A first device for performing wireless communication, the first device comprising:
- one or more memories storing instructions;
- one or more transceivers; and
- one or more processors connected to the one or more memories and the one or more transceivers, wherein the one or more processors execute the instructions to:
- receive a TDD-UL-DL configuration information, from a base station, including information related to a first slot pattern and information related to a second slot pattern,
- wherein the information related to the first slot pattern includes information related to a periodicity of the first slot pattern and information related to a first UL resource, and
- wherein the information related to the second slot pattern includes information related to a periodicity of the second slot pattern and information related to a second UL resource;
- determine a value related to granularity, based on i) the periodicity of the first slot pattern, ii) the periodicity of the second slot pattern and iii) a first subcarrier spacing (SCS) related to SL communication; and
- transmit a physical sidelink broadcast channel (PSBCH), to a second device, including information related to the first UL resource and information related to the second UL resource,
- wherein the information related to the first UL resource and information related to the second UL resource are expressed based on a unit related to a second SCS, and
- wherein the second SCS is obtained based on a value obtained by dividing the first SCS by the value related to the granularity.

15. A device adapted to control a first user equipment (UE), the device comprising:
- one or more processors; and
- one or more memories operably connectable to the one or more processors and storing instructions, wherein the one or more processors execute the instructions to:
- receive a TDD-UL-DL configuration information, from a base station, including information related to a first slot pattern and information related to a second slot pattern,
- wherein the information related to the first slot pattern includes information related to a periodicity of the first slot pattern and information related to a first UL resource, and
- wherein the information related to the second slot pattern includes information related to a periodicity of the second slot pattern and information related to a second UL resource;
- determine a value related to granularity, based on i) the periodicity of the first slot pattern, ii) the periodicity of the second slot pattern and iii) a first subcarrier spacing (SCS) related to SL communication; and
- transmit a physical sidelink broadcast channel (PSBCH), to a second UE, including information related to the first UL resource and information related to the second UL resource,
- wherein the information related to the first UL resource and information related to the second UL resource are expressed based on a unit related to a second SCS, and
- wherein the second SCS is obtained based on a value obtained by dividing the first SCS by the value related to the granularity.

* * * * *